United States Patent
Yoshida et al.

(10) Patent No.: US 10,906,579 B2
(45) Date of Patent: Feb. 2, 2021

(54) POWER STEERING APPARATUS

(71) Applicant: HITACHI AUTOMOTIVE SYSTEMS, LTD., Hitachinaka (JP)

(72) Inventors: Osamu Yoshida, Yokohama (JP); Masatoshi Enomoto, Sagamihara (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 327 days.

(21) Appl. No.: 16/083,836

(22) PCT Filed: Feb. 17, 2017

(86) PCT No.: PCT/JP2017/005810
§ 371 (c)(1),
(2) Date: Sep. 10, 2018

(87) PCT Pub. No.: WO2017/154511
PCT Pub. Date: Sep. 14, 2017

(65) Prior Publication Data
US 2019/0077445 A1    Mar. 14, 2019

(30) Foreign Application Priority Data
Mar. 11, 2016    (JP) .................. 2016-048585

(51) Int. Cl.
*B62D 5/04*    (2006.01)
*F16H 25/22*   (2006.01)
*F16H 25/24*   (2006.01)

(52) U.S. Cl.
CPC .......... *B62D 5/0448* (2013.01); *F16H 25/22* (2013.01); *F16H 25/2214* (2013.01);
(Continued)

(58) Field of Classification Search
CPC ......... B62D 5/0448; B62D 5/04; F16H 25/22; F16H 25/2214; F16H 25/2228;
(Continued)

(56) References Cited

U.S. PATENT DOCUMENTS 10,113,620 B2 * 10/2018 Hsieh .................. F16H 25/2223
2003/0062719 A1 * 4/2003 Chiu ................... F16H 25/2214
                                                        285/134.1
(Continued)

FOREIGN PATENT DOCUMENTS

JP    2003-343683         12/2003
JP    2013-024318 A        2/2013
(Continued)

*Primary Examiner* — Ruth Ilan
*Assistant Examiner* — Harold Eric Pahlck, III
(74) *Attorney, Agent, or Firm* — Foley & Lardner LLP

(57) ABSTRACT

Provided is a power steering apparatus capable of improving accuracy of relative positions of a first circulation member and a second circulation member. A tube 23 includes a first first-tube-side abutment portion 40 and a second second-tube-side abutment portion 51, and a second first-tube-side abutment portion 41 and a first second-tube-side abutment portion 51, which are configured to restrict relative positions of a first tube 31 and a second tube 32 in a circumferential direction relative to a nut 8.

16 Claims, 11 Drawing Sheets

(52) U.S. Cl.
CPC ..... *F16H 25/2223* (2013.01); *F16H 25/2228* (2013.01); *F16H 25/24* (2013.01)

(58) Field of Classification Search
CPC .. F16H 25/24; F16H 25/2204; F16H 25/2223; F16H 2025/2081
See application file for complete search history.

(56) References Cited

U.S. PATENT DOCUMENTS

| | | | |
|---|---|---|---|
| 2009/0071272 A1* | 3/2009 | Lin | F16H 25/2214 74/89.44 |
| 2015/0060188 A1 | 3/2015 | Kitamura et al. | |
| 2016/0333995 A1 | 11/2016 | Togashi et al. | |

FOREIGN PATENT DOCUMENTS

| | | |
|---|---|---|
| JP | 2013-104535 | 5/2013 |
| JP | 2015-047997 | 3/2015 |
| JP | 2015-152065 A | 8/2015 |

\* cited by examiner

POWER STEERING APPARATUS

TECHNICAL FIELD

The present invention relates to a power steering apparatus.

BACKGROUND ART

Conventionally, there has been known a power steering apparatus configured to transmit a rotational force of an electric motor to a nut via an input pulley, a belt, and an output pulley to axially drive a rack bar. A circulation mechanism is provided on an outer periphery of the nut. The circulation mechanism causes a plurality of balls provided in a ball circulation groove inside the nut to circulate from one end side to the other end side of the ball circulation groove. PTL 1 discusses one example regarding the above-described technique.

CITATION LIST

Patent Literature

PTL 1: Japanese Patent Application Public Disclosure No. 2015-47997

SUMMARY OF INVENTION

Technical Problem

In the above-described conventional technique, forming the circulation mechanism by placing a first circulation member and a second circulation member in abutment with each other in an axial direction of the nut may lead to a misalignment between relative positions of the first circulation member and the second circulation member in a circumferential direction of the nut, and this misalignment may affect the circulation of the balls.

An object of the present invention is to provide a power steering apparatus capable of improving accuracy of the relative positions of the first circulation member and the second circulation member.

Solution to Problem

According to one embodiment of the present invention, a power steering includes a first-circulation-member-side abutment portion and a second-circulation-member-side abutment portion configured to restrict relative positions of a first circulation member and a second circulation member in a circumferential direction.

Advantageous Effects of Invention

Therefore, the present invention can improve the accuracy of the relative positions of the first circulation member and the second circulation member.

DESCRIPTION OF EMBODIMENTS

First Embodiment

[Power Steering Apparatus]

Figure 1:
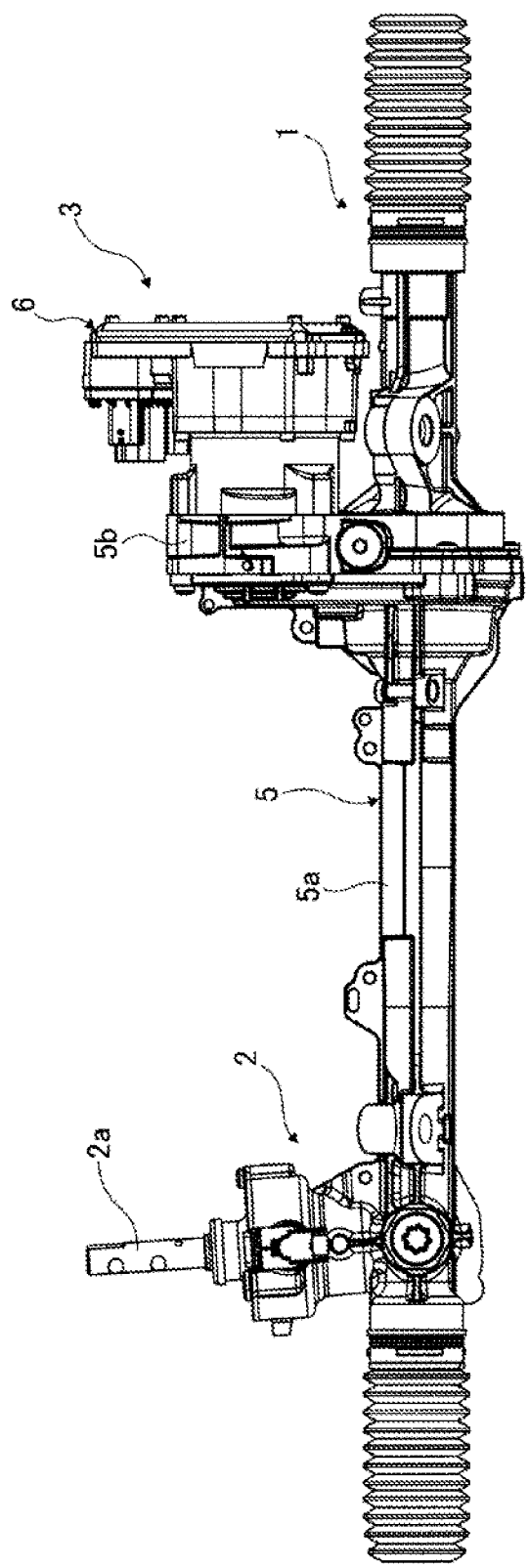
FIG. 1 illustrates a power steering apparatus 1 according to a first embodiment as viewed from a front side of a vehicle.
Figure 2:
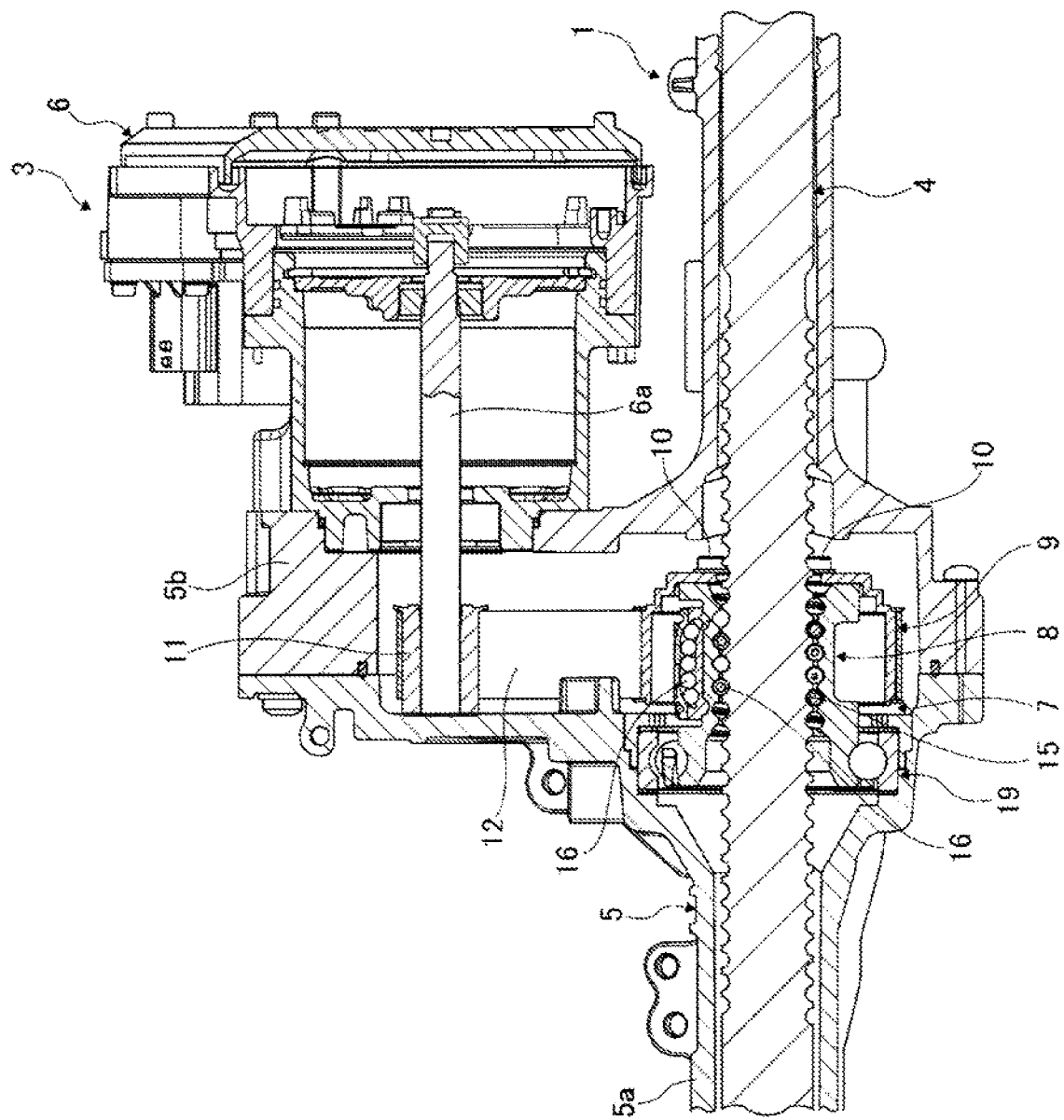
FIG. 2 is a partial cross-sectional view of FIG. 1.

FIG. 1 illustrates a power steering apparatus 1 according to a first embodiment as viewed from a front side of a vehicle. FIG. 2 is a partial cross-sectional view of FIG. 1.

The power steering apparatus 1 according to the first embodiment includes a steering mechanism 2 and an assist mechanism 3. The steering mechanism 2 transmits a rotation of a steering wheel rotationally operated by a driver to a rack bar (a wheel turning shaft) 4, which turns a front wheel (a turning target wheel). The steering mechanism 2 includes a steering shaft 2a coupled with the steering wheel, and a pinion shaft (not illustrated) meshed with a rack of the rack bar 4. The steering shaft 2a and the pinion shaft are coupled with each other via a torsion bar. The assist mechanism 3 provides an assist force for reducing a steering load imposed on the driver to the rack bar 4. The steering mechanism 2 and the assist mechanism 3 are contained inside a housing 5, which includes a rack bar containing portion 5a and a speed reducer containing portion 5b. The rack bar containing portion 5a axially movably contains the rack bar 4 therein. The speed reducer containing portion 5b is disposed at an axially intermediate portion of the rack bar containing portion 5a, and contains therein a speed reducer, which will be described below.

The assist mechanism 3 includes an electric motor 6 and a ball screw mechanism 7. An output of the electric motor 6 is controlled by a not-illustrated controller according to a torque of the torsion bar (a steering torque), a vehicle speed, and the like. The ball screw mechanism 7 converts a rotational motion of the electric motor 6 into a liner motion and transmits this motion to the rack bar 4. The ball screw mechanism 7 includes a nut 8 and an output pulley 9. The output pulley 9 is formed cylindrically so as to surround the nut 8. The output pulley 9 is fastened to the nut 8 with use of four bolts 10. A cylindrical input pulley 11 is fixed to a driving shaft 6a of the electric motor 6. A belt 12 is wound between the output pulley 9 and the input pulley 11. The output pulley 9 is formed in such a manner that an outer diameter thereof is larger than an outer diameter of the input pulley 11. Therefore, the input pulley 11, the belt 12, and the output pulley 9 function as the speed reducer of the electric motor 6. The input pulley 11, the belt 12, and the output pulley 9 are contained inside the speed reducer containing portion 5b.

The nut 8 is made of metal, and is formed cylindrically so as to surround the rack bar 4. The nut 8 is supported rotatably relative to the housing 5 via a ball bearing 19. A helical nut-side ball screw groove 13 is formed on an inner periphery of the nut 8. On the other hand, a helical rack bar-side ball screw groove (a turning target wheel-side ball screw groove) 14 is formed on an outer periphery of the rack bar 4. A ball circulation groove 15 is formed by the nut-side ball screw groove 13 and the rack bar-side ball screw groove 14. A plurality of metallic balls 16 is loaded in the ball circulation groove 15. The ball screw mechanism 7 functions in such a manner that the rack bar 4 axially moves relative to the nut 8 according to a movement of the balls 16 in the ball circulation groove 15 due to a rotation of the nut 8.

(Nut)

Figure 4:
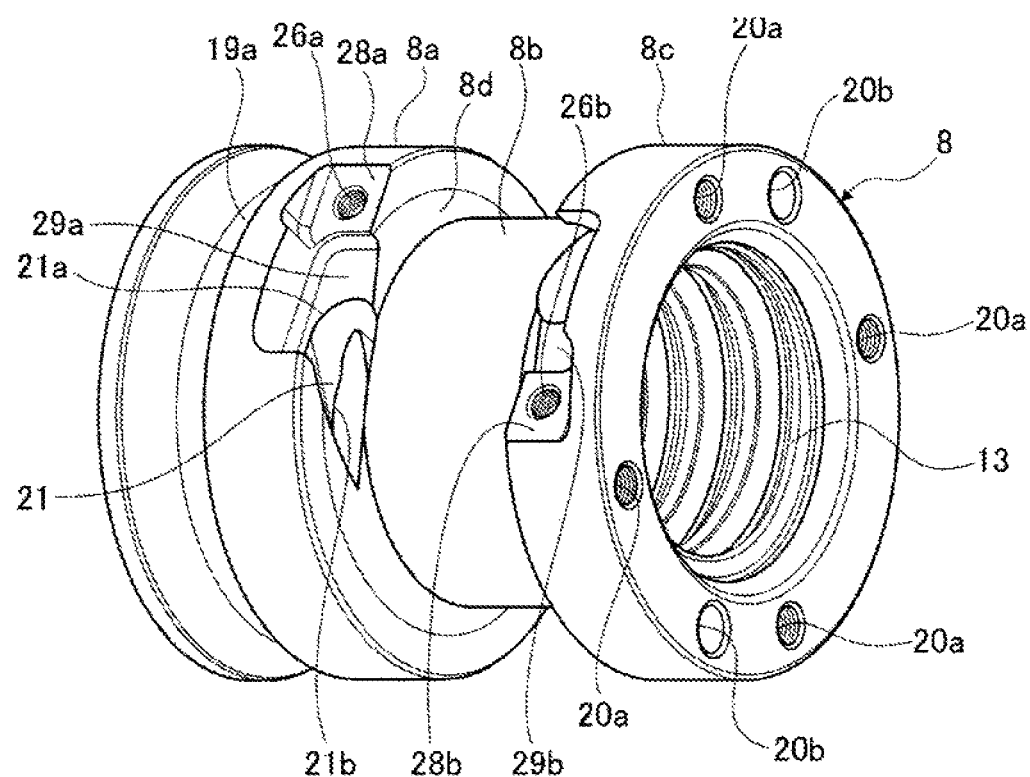
FIG. 4 is a perspective view of a nut 8 as viewed from an X-axis positive direction side.
Figure 5:
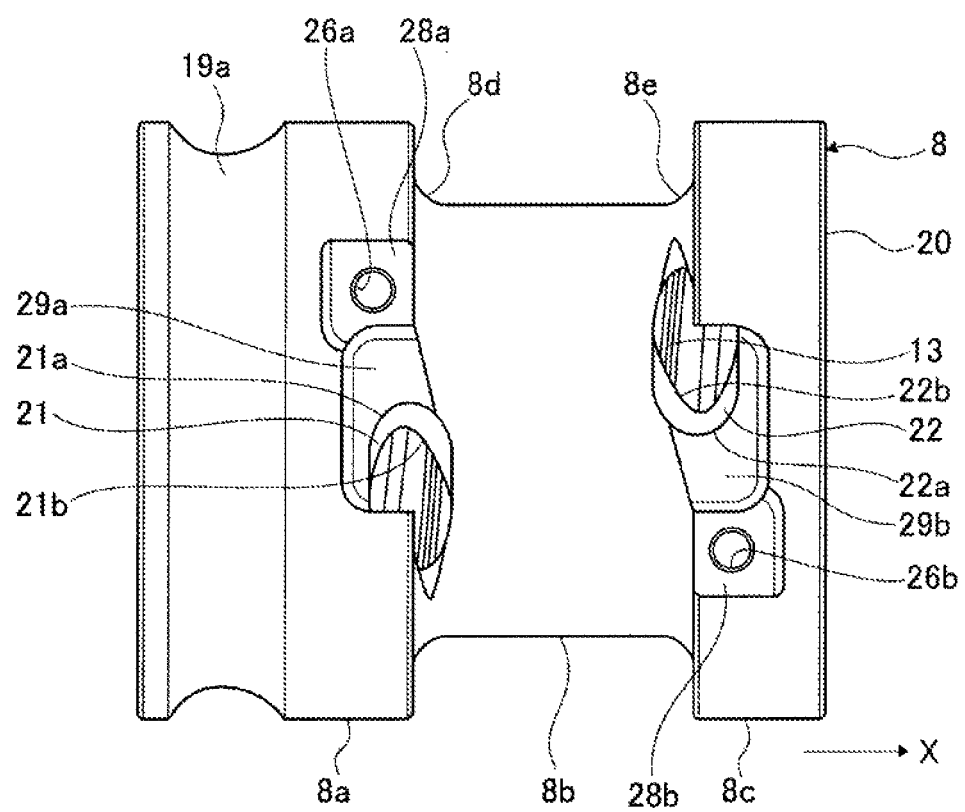
FIG. 5 illustrates the nut 8 as viewed from a radial direction.

Next, a configuration of the nut 8 will be described in detail. In FIG. 1, an X axis is set to an axial direction of the rack bar 4. Then, an X axis positive direction is defined to be a direction extending from one side where the steering mechanism 2 is located toward the other side where the assist mechanism 3 is located, and a radial direction is defined to be a direction orthogonal to the X axis. FIG. 4 is a perspective view of the nut 8 as viewed from the X-axis positive direction side. FIG. 5 illustrates the nut 8 as viewed from the radial direction.

The nut 8 includes a first flange portion 8a, a main body portion 8b, and a second flange portion 8c. The main body portion 8b is provided at an intermediate portion of the nut 8 in the X-axis direction. The first flange portion 8a is provided on an X-axis negative direction side with respect to the main body portion 8b. The second flange portion 8c is provided on an X-axis positive direction side with respect to the main body portion 8b. Outer peripheries of the first flange portion 8a and the second flange portion 8c protrude beyond an outer periphery of the main body portion 8b outward in the radial direction. The first flange portion 8a and the second flange portion 8c are formed so as to be thicker than the main body portion 8b. An outer diameter of the second flange portion 8c is equal to an outer diameter of the first flange portion 8a. A first rounded portion 8d is provided between the main body portion 8b and the first flange portion 8a. The first rounded portion 8d is formed into such an arc-like shape that an outer dimension thereof in the radial direction of the nut 8 gradually increases toward the X-axis negative direction. A second rounded portion 8e is provided between the main body portion 8b and the second flange portion 8c. The second rounded portion 8e is formed into such an arc-like shape that an outer dimension thereof in the radial direction of the nut 8 gradually increases toward the X-axis positive direction.

An inner race 19a of the ball bearing 19 is integrally formed around an end in the X-axis negative direction on the outer periphery of the first flange portion 8a. An outer race 19b of the ball bearing 19 is fixed to the housing 5. A plurality of bearing balls 19c is disposed between the inner race 19a and the outer race 19b. The nut-side ball screw groove 13 is provided inside the main body portion 8b. On an end surface 20 of the second flange portion 8c on the X-axis positive direction side, a female screw portion 20a, which is meshed with the bolt 10, is provided so as to have a pith of 90 degrees in a direction around a rotational axis O of the nut 8 (hereinafter referred to as a circumferential direction). The rotational axis O and the X axis extend in parallel with each other. Further, a nut-side pin hole 20b is provided on the end surface 20 on the X-axis positive direction side. A not-illustrated locater pin is inserted in the nut-side pin hole 20b when the output pulley 9 is attached to the nut 8.

A first connection passage 21 and a second connection passage 22 are provided on the nut 8. The first connection passage 21 is in communication with an end of the ball circulation groove 15 in the X-axis negative direction. The second connection passage 22 is in communication with an end of the ball circulation groove 15 in the X-axis positive direction. The first connection passage 21 includes a first outer peripheral-side opening portion 21a and a first inner peripheral-side opening portion 21b. The first outer peripheral-side opening portion 21a is opened on an outer peripheral surface of the nut 8. The first inner peripheral-side opening portion 21b is opened on an inner peripheral surface of the nut 8. The first outer peripheral-side opening portion 21a is provided at a position extending across the first flange portion 8a and the main body portion 8b. The first inner peripheral-side opening portion 21b is provided at a position offset from the first outer peripheral-side opening portion 21a toward one side in the circumferential direction of the nut 8 (a counterclockwise direction as viewed from the X-axis positive direction side). The second connection passage 22 includes a second outer peripheral-side opening portion 22a and a second inner peripheral-side opening portion 22b. The second outer peripheral-side opening portion 22a is opened on the outer peripheral surface of the nut 8. The second inner peripheral-side opening portion 22b is opened on the inner peripheral surface of the nut 8. The second inner peripheral-side opening portion 22b is provided an opposite side from the first inner peripheral-side opening portion 21b in the circumferential direction of the nut 8. The second outer peripheral-side opening portion 22a is provided between the first inner peripheral-side opening portion 21b and the second inner peripheral-side opening portion 22b in the circumferential direction of the nut 8. The second outer peripheral-side opening portion 22a is provided at a position extending across the main body portion 8b and the second flange portion 8c. The nut-side ball screw groove 13 is formed in such a manner that when being viewed from the X-axis positive direction side, the number of windings thereof in the counterclockwise direction from the first inner peripheral-side opening portion 21b to the second inner peripheral-side opening portion 22b has a value after a decimal point that is larger than 0.5.

Figure 3:
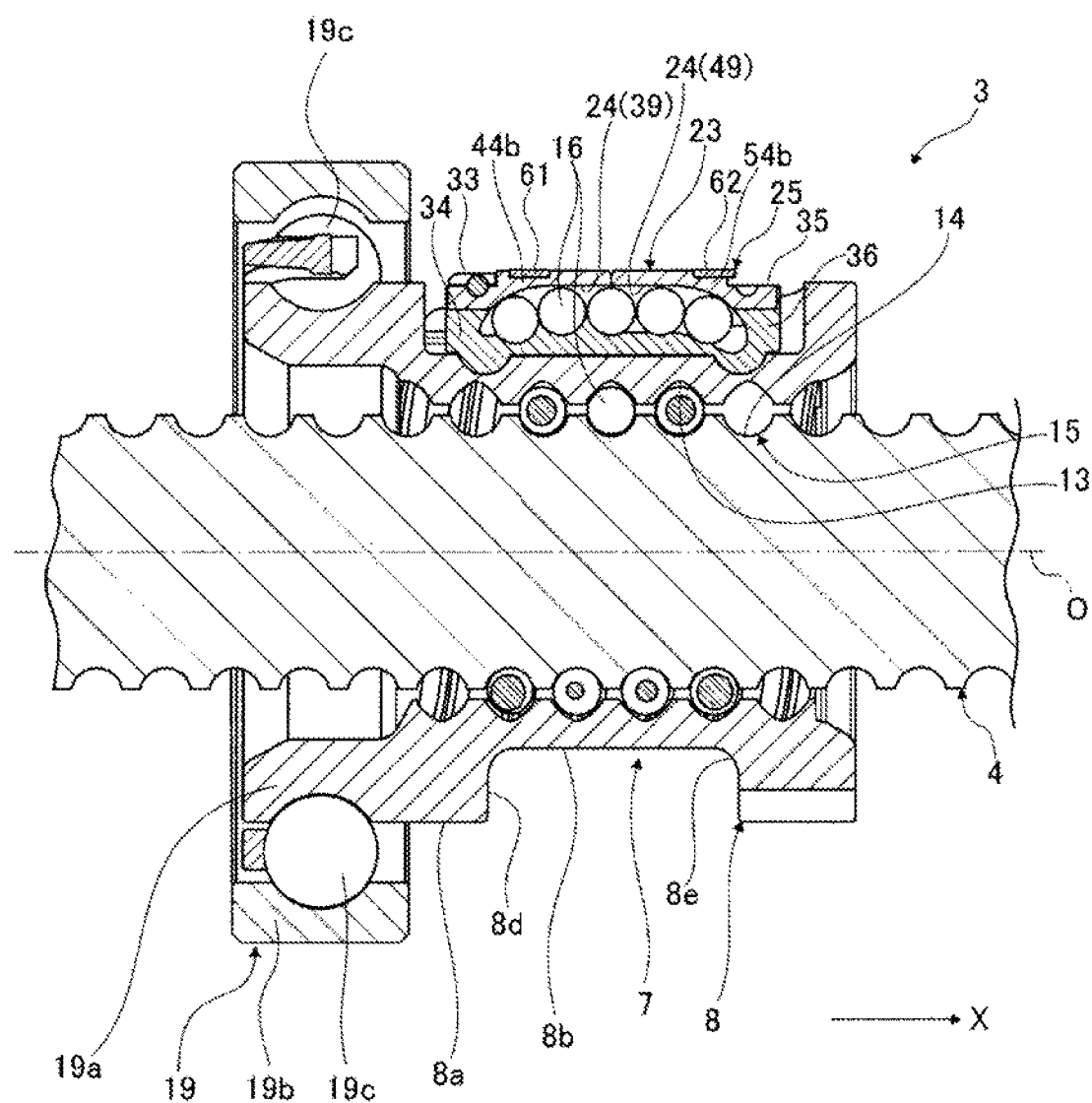
FIG. 3 is an enlarged view of main portions illustrated in FIG. 2.
Figure 6:
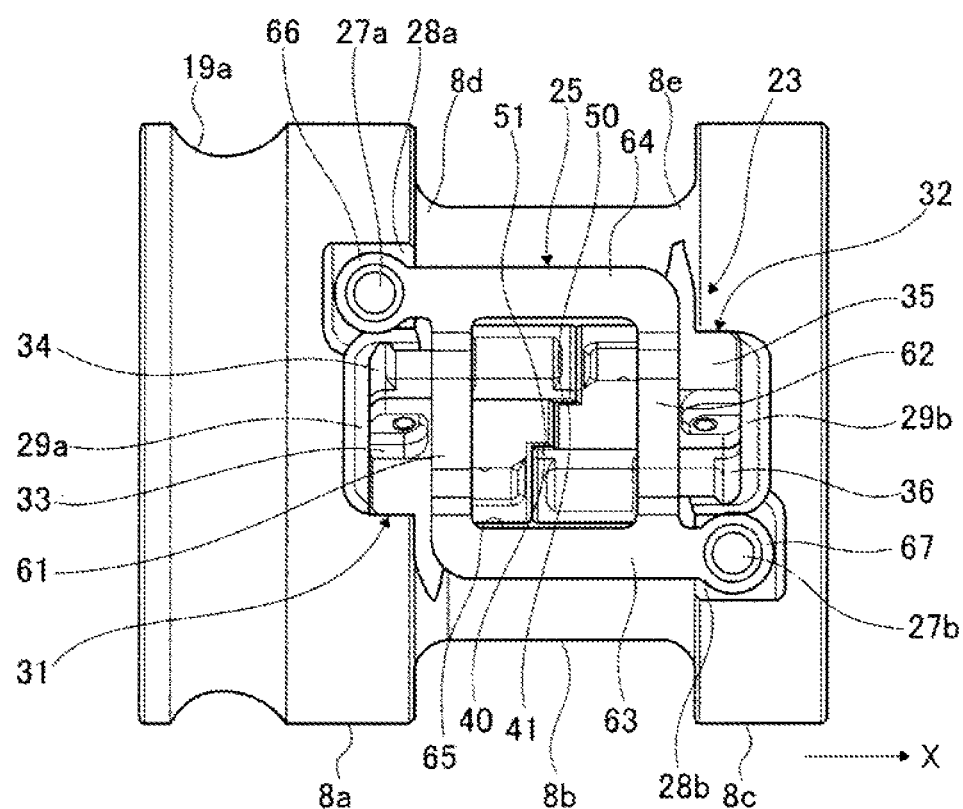
FIG. 6 illustrates the nut 8, a tube 23, and a clip 25 as viewed from the radial direction.

As illustrated in FIG. 3, a tube 23 made from synthetic resin is attached to the nut 8. The tube 23 functions to cause the plurality of balls 16 to circulate from one end side to the other end side of the ball circulation groove 15, and includes therein a circulation passage 24 in which the balls 16 are movable. Ends of the circulation passage 24 in the X-axis negative direction and the X-axis positive direction are connected to the first connection passage 21 and the second connection passage 22, respectively. FIG. 6 illustrates the nut 8, the tube 23, and the clip 25 as viewed from the radial direction. The tube 23 is fixed to the nut 8 by the clip (a fixation member) 25. A first female screw portion 26a and a second female screw portion 26b are provided on the first flange portion 8a and the second flange portion 8c of the nut 8, respectively. The first female screw portion 26a and the second female screw portion 26b are used to fix the clip 25 by a first screw member 27a and a second screw member 27b, respectively. The first female screw portion 26a is disposed at an approximately central position of a first flat surface portion 28a provided on the first flange portion 8a. The second female screw portion 26b is disposed at an approximately central position of a second flat surface portion 28b provided on the second flange portion 8c. The first flat surface portion 28a is disposed on one side in the circumferential direction of the nut 8 with respect to the tube 23, and the second flat surface portion 28b is disposed on the other side in the circumferential direction of the nut 8 with respect to the tube 23. The first flat surface portion 28a and the second flat surface portion 28b are provided in the same plane.

The tube 23 is provided so as to be located on an outer side of the main body portion 8b in the radial direction of the nut 8, and overlap a part of the first flange portion 8a, the main body portion 8b, and the second flange portion 8c in the X-axis direction. Flat surface portions 29a and 29b are provided on the first flange portion 8a and the second flange portion 8c, respectively. The flat surface portions 29a and 29b are in abutment with an inner side of the tube 23 in the radial direction. Both the flat surface portions 29a and 29b extend in parallel with the first flat surface portion 28a and the second flat surface portion 28b. The tube 23 has a shape two-fold symmetric with respect to a predetermined axis passing through a center of the tube 23 and extending orthogonally to the X axis. The predetermined axis extends orthogonally to the first flat surface portion 28a, the second flat surface portion 28b, and the flat surface portions 29a and 29b. The tube 23 includes a first tube (a first circulation member) 31 and a second tube (a second circulation member) 32.

[First Tube]

Figure 7:
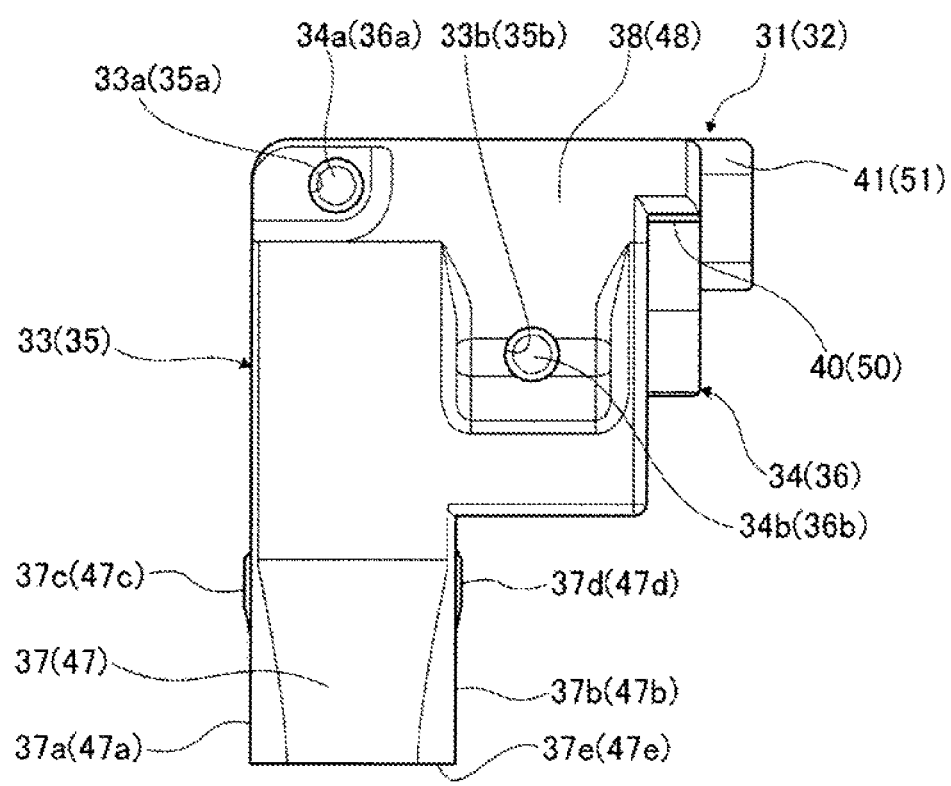
FIG. 7 illustrates a first-tube 31 as viewed from the radial direction.
Figure 8:
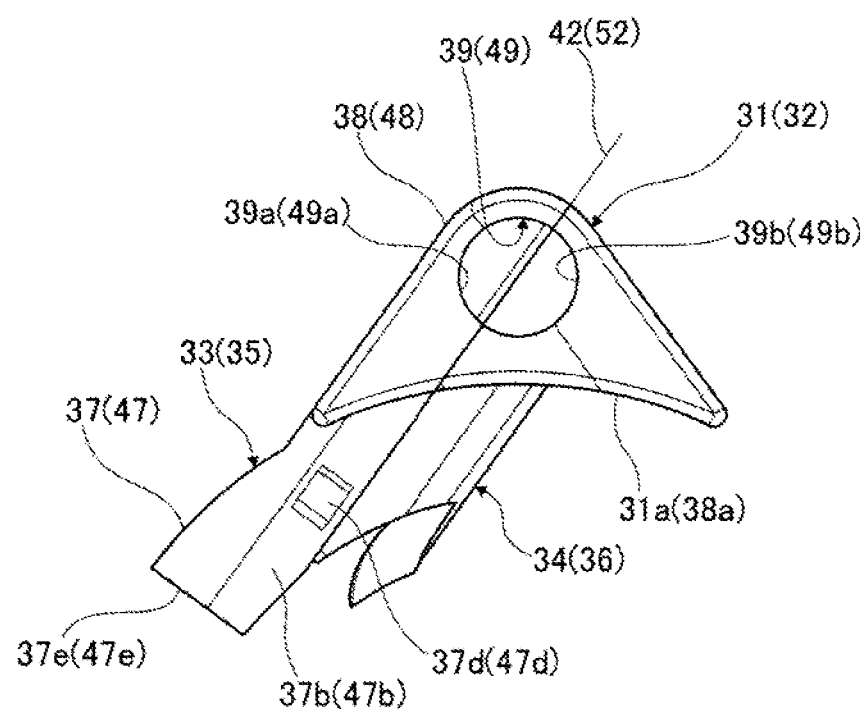
FIG. 8 illustrates the first tube 31 as viewed from the X-axis positive direction side.
Figure 9:
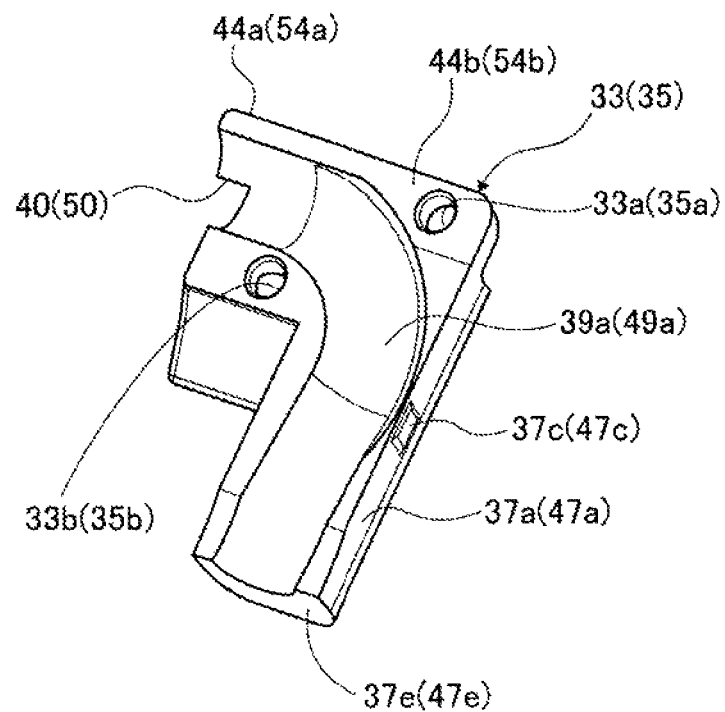
FIG. 9 is a perspective view of a first first-tube 33 as viewed from an inner side.
Figure 10:
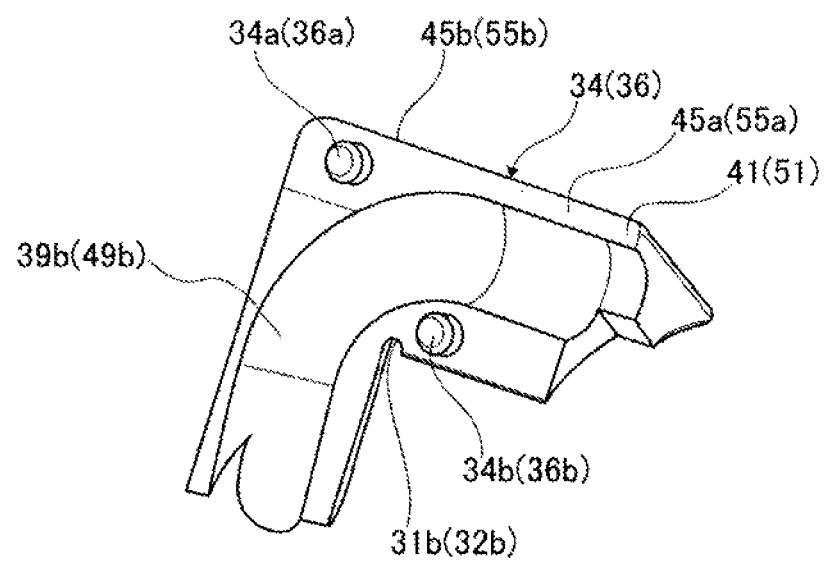
FIG. 10 is a perspective view of a second first-tube 34 as viewed from the inner side.

Next, a configuration of the first tube 31 will be described in detail. FIG. 7 illustrates the first tube 31 as viewed from the radial direction. FIG. 8 illustrates the first tube 31 as viewed from the X-axis positive direction side. FIG. 9 is a perspective view of a first first-tube 33 as viewed from an inner side. FIG. 10 is a perspective view of a second first-tube 34 as viewed from the inner side.

The first tube 31 includes a first insertion portion 37, a first circulation portion 38, and a first ball circulation passage 39. The first insertion portion 37 extends to the one side in the circumferential direction of the nut 8, and is formed so as to be able to be inserted in the first connection passage 21. The first circulation portion 38 is formed so as to extend in the X-axis positive direction from the first outer peripheral-side opening portion 21a to around a center of the main body portion 8b in the X-axis direction. The first ball circulation passage 39 is provided inside the first tube 31 from a distal end of the first insertion portion 37 to an end of the first circulation portion 38 in the X-axis positive direction, and has a generally L-like shape with a corner portion thereof shaped in an arc-like manner as viewed from the radial direction of the nut 8. The first ball circulation passage 39 has a circular cross section in which the balls 16 can pass through. As illustrated in FIG. 8, a first arc-shaped portion (a first radial position restriction portion) 31a is provided on an inner side of the first circulation portion 38 in the radial direction. The first arc-shaped portion 31a restricts a relative movement of the first tube 31 inward in the radial direction relative to the nut 8 due to abutment with the outer peripheral surface of the main body portion 8b. The first arc-shaped portion 31a has a shape conforming to the outer peripheral surface of the main body portion 8b. A first first-tube-side abutment portion (a first first-circulation-member-side abutment portion) 40 and a second first-tube-side abutment portion (a second first-circulation-member-side abutment portion) 41 are provided on an end of the first circulation portion 38 in the X-axis positive direction. The first first-tube-side abutment portion 40 and the second first-tube-side abutment portion 41 extend in the X-axis direction, and are provided so as to be oriented toward the one side in the circumferential direction of the nut 8. The first first-tube-side abutment portion 40 is provided on the first first-tube 33, and the second first-tube-side abutment portion 41 is provided on the second first-tube 34. The second first-tube-side abutment portion 41 is provided on the other side in the circumferential direction of the nut 8 and on the X-axis positive direction side, with respect to the first first-tube-side abutment portion 40. The first insertion portion 37 includes a pair of flat surface portions 37a and 37b orthogonal to the X-axis direction on the both sides in the X-axis direction. Protrusion portions (first axial position restriction portions) 37c and 37d are provided on both the flat surface portions 37a and 37b, respectively. The protrusion portions 37c and 37d protrude in the X-axis direction. Both the protrusion portions 37c and 37d are compressed and deformed in the X-axis direction when the first insertion portion 37 is inserted in the first connection passage 21, thereby restricting a relative movement of the first insertion portion 37 in the X-axis direction relative to the first connection passage 21. As illustrated in FIG. 3, a recessed first runout portion 31b is provided at a portion of the first tube 31 that faces the first rounded portion 8d. The first runout portion 31b serves to separate the first tube 31 from the first rounded portion 8d.

Figure 11:
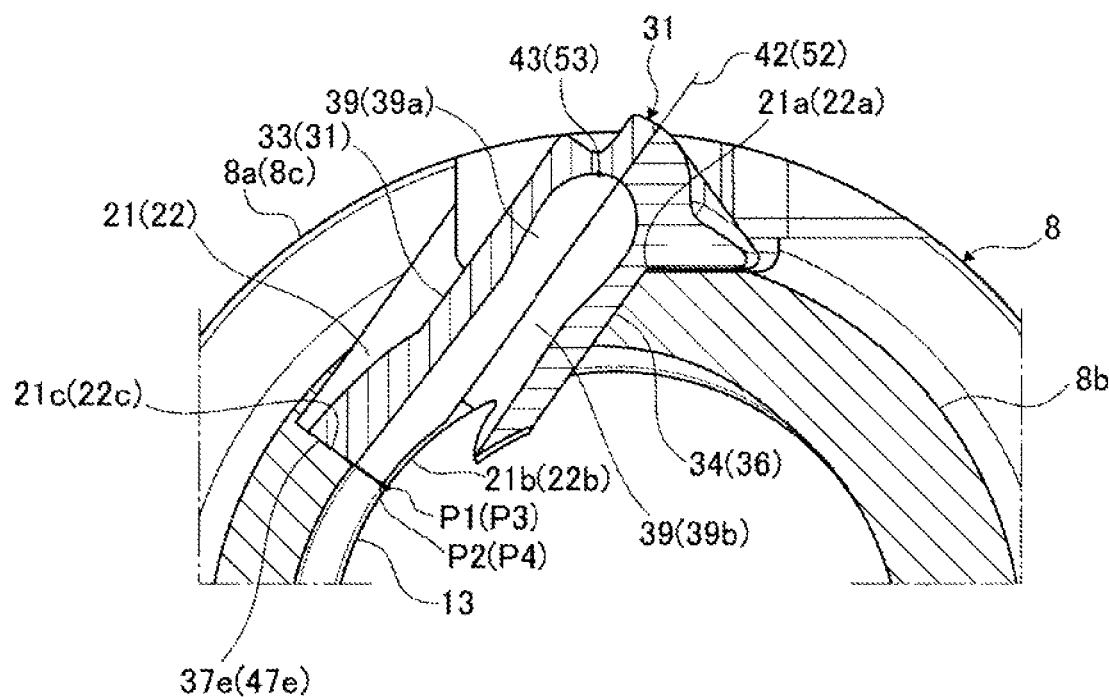
FIG. 11 is a radial cross-sectional view of the first-tube 31.

The first tube 31 includes the first first-tube 33 and the second first-tube 34. The first first-tube 33 and the second first-tube 34 are respectively provided on one side and the other side of a first division surface 42 passing through an approximately central point of the circular cross section of the first ball circulation passage 39. The first ball circulation passage 39 is divided by the first division surface 42 into two grooves, i.e., a circulation groove 39a on one side where the first first-tube 33 is located and a circulation groove 39b on the other side where the second first-tube 34 is located. Both the circulation grooves 39a and 39b each have a semicircular cross section. As illustrated in FIG. 11, the first division surface 42 is provided at a position offset from a point 43 of the first circulation passage 39 that is located farthest way from the rotational axis O of the nut 8. The second first-tube-side abutment portion 41 is formed in the same plane as the first division surface 42. As illustrated in FIG. 11, the first connection passage 21 includes a first end surface abutment portion 21c at an end portion on one side where the first inner peripheral-side opening portion 21b is located. An end surface 37e of the first insertion portion 37 opposite from the first circulation portion 38 is in abutment with the first end surface abutment portion 21c. A radially inner end P1 of the first end surface abutment portion 21c is formed so as to be positioned on an inner side in the radial direction with respect to a radially inner end P2 of the end surface 37e.

The first first-tube 33 includes a first constant thickness portion 44a and a first thick portion 44b provided on an outer side of the circulation groove 39a in the radial direction. The first constant thickness portion 44a is formed in such a manner that a thickness thereof is kept approximately constant between an outer surface of the first-first tube 33 and the circulation groove 39a. The first thick portion 44b is formed in such a manner that a thickness thereof is thicker than the first constant thickness portion 44a between the outer surface of the first first-tube 33 and the circulation groove 39a. The first first-tube 33 includes a first-tube-side first protrusion portion insertion hole (a first-circulation-member-side first protrusion portion insertion hole) 33a and a first-tube-side second protrusion portion insertion hole (a first-circulation-member-side second protrusion portion insertion hole) 33b. The first-tube-side first protrusion portion insertion hole 33a is disposed on an outer side of an arc-shaped portion of the circulation groove 39a (the first thick portion 44b). The first-tube-side second protrusion portion insertion hole 33b is disposed on an inner side of the arc-shaped portion of the circulation groove 39a (an inner side of the first constant thickness portion 44a in the radial direction). An inner diameter of the first-tube-side second protrusion portion insertion hole 33b is smaller than an inner diameter of the first-tube-side first protrusion portion insertion hole 33a.

The second first-tube 34 includes a first constant thickness portion 45a and a first thick portion 45b provided on an outer side of the circulation groove 39b in the radial direction. The first constant thickness portion 45a is formed in such a manner that a thickness thereof is kept approximately constant between an outer surface of the second first-tube 34 and the circulation groove 39b. The first thick portion 45b is formed in such a manner that a thickness thereof is thicker than the first constant thickness portion 45a between the outer surface of the second first-tube 34 and the circulation groove 39b. The second first-tube 34 includes a first-tube-side first protrusion portion (a first-circulation-member-side first protrusion portion) 34a and a first-tube-side second protrusion portion (a first-circulation-member-side second protrusion portion) 34b, which are a pair of protrusion portions protruding toward one side where the first first-tube 33 is located. The first-tube-side first protrusion portion 34a is disposed on an outer side of an arc-shaped portion of the circulation groove 39b (the first thick portion 45b). The first-tube-side second protrusion portion 34b is disposed on an inner side of the arc-shaped portion of the circulation groove 39b (an inner side of the first constant thickness portion 45a in the radial direction). The first-tube-side first protrusion portion 34a and the first-tube-side second protrusion portion 34b have identical shapes. Therefore, when the first tube 31 is assembled, the first-tube-side first protrusion portion 34a is fitted to the first-tube-side first protrusion portion insertion hole 33a in a clearance-fit manner, and the first-tube-side second protrusion portion 34b is press-fitted in the first-tube-side second protrusion portion insertion hole 33b.

[Second Tube]

Next, a configuration of the second tube 32 will be described in detail. The second tube 32 has an identical shape to the first tube 31, and therefore will be described with reference to FIGS. 7 to 11. In FIGS. 7 to 11, a reference numeral of each portion of the second tube 32 are indicated inside parentheses ( ).

The second tube 32 includes a second insertion portion 47, a second circulation portion 48, and a second ball circulation passage 49. The second insertion portion 47 extends to the other side in the circumferential direction of the nut 8, and is formed so as to be able to be inserted in the second connection passage 22. The second circulation portion 48 is formed so as to extend in the X-axis direction from the second outer peripheral-side opening portion 22a to around the center of the main body portion 8b in the X-axis direction, and is in abutment with the first circulation portion 38 in the X-axis direction. The second ball circulation passage 49 is provided inside the second tube 32 from a distal end of the second insertion portion 47 to an end of the second circulation portion 38 in the X-axis negative direction, and has a generally L-like shape with a corner portion thereof replaced with an arc-like shape as viewed from the radial direction of the nut 8. The second ball circulation passage 49 has a circular cross section in which the balls 16 can pass through. The second ball circulation passage 49 is in communication with the first ball circulation passage 39. As illustrated in FIG. 8, a second arc-shaped portion (a second radial position restriction portion) 38a is provided on an inner side of the second circulation portion 38 in the radial direction. The second arc-shaped portion 38a restricts a relative movement of the second tube 32 inward in the radial direction relative to the nut 8 due to abutment with the outer peripheral surface of the main body portion 8b. The second arc-shaped portion 38a has a shape conforming to the outer peripheral surface of the main body portion 8b. A first second-tube-side abutment portion (a first second-circulation-member-side abutment portion) 50 and a second second-tube-side abutment portion (a second second-circulation-member-side abutment portion) 51 are provided on an end of the second circulation portion 38 in the X-axis negative direction. The first second-tube-side abutment portion 50 and the second second-tube-side abutment portion 51 extend in the X-axis direction, and are provided so as to be oriented toward the other side in the circumferential direction of the nut 8. The first second-tube-side abutment portion 50 is in abutment with the second first-tube-side abutment portion 41 of the first tube 31. The second second-tube-side abutment portion 51 is in abutment with the first first-tube-side abutment portion 40 of the first tube 31. The first second-tube-side abutment portion 50 is provided on a first second-tube 35, and the second second-tube-side abutment portion 51 is provided on a second second-tube 36. The second second-tube-side abutment portion 51 is provided on the one side in the circumferential direction of the nut 8 and on the X-axis negative direction side, with respect to the first second-tube-side abutment portion 50. The second insertion portion 47 includes a pair of flat surface portions 47a and 47b orthogonal to the X-axis direction on the both sides in the X-axis direction. Protrusion portions (second axial position restriction portions) 47c and 47d are provided on both the flat surface portions 47a and 47b, respectively. The protrusion portions 47c and 47d protrude in the X-axis direction. Both the protrusion portions 47c and 47d are compressed and deformed in the X-axis direction when the second insertion portion 47 is inserted in the second connection passage 22, thereby restricting a relative movement of the second insertion portion 47 in the X-axis direction relative to the second connection passage 22. As illustrated in FIG. 3, a recessed second runout portion 32b is provided at a portion of the second tube 32 that faces the second rounded portion 8e. The second runout portion 32b serves to separate the second tube 32 from the second rounded portion 8e.

The second tube 32 includes the first second-tube 35 and the second second-tube 36. The first second-tube 35 and the second second-tube 36 are respectively provided on one side and the other side of a second division surface 52 passing through an approximately central point of the circular cross section of the second ball circulation passage 49. The second ball circulation passage 49 is divided by the second division surface 52 into two grooves, i.e., a circulation groove 49a on one side where the first second-tube 35 is located and a circulation groove 49b on the other side where the second second-tube 36 is located. Both the circulation grooves 49a and 49b each have a semi-circular cross section. As illustrated in FIG. 11, the second division surface 52 is provided at a position offset from a point 53 of the second ball circulation passage 49 that is located farthest way from the rotational axis O of the nut 8. The second second-tube-side abutment portion 51 is formed in the same plane as the second division surface 52. As illustrated in FIG. 11, the second connection passage 22 includes a second end surface abutment portion 22c at an end portion on one side where the second inner peripheral-side opening portion 22b is located. An end surface 47e of the second insertion portion 47 opposite from the second circulation portion 48 is in abutment with the second end surface abutment portion 22c. A radially inner end P3 of the second end surface abutment portion 22c is formed so as to be positioned on an inner side in the radial direction with respect to a radially inner end P4 of the end surface 47e. When being viewed from the X-axis direction, an angle on one side where the tube 23 is located, of angles sandwiched by a straight line connecting the first end surface abutment portion 21c and the rotational axis O and a straight line connecting the second end surface abutment portion 22c and the rotational axis O, is set to a minor angle (smaller than 180 degrees).

The first second-tube 35 includes a second constant thickness portion 54a and a second thick portion 54b provided on an outer side of the circulation groove 49a in the radial direction. The second constant thickness portion 54a is formed in such a manner that a thickness thereof is kept approximately constant between an outer surface of the first second-tube 35 and the circulation groove 49a. The second thick portion 54b is formed in such a manner that a thickness thereof is thicker than the second constant thickness portion 54a between the outer surface of the first second-tube 35 and the circulation groove 49a. The first second-tube 35 includes a second-tube-side first protrusion portion insertion hole (a second-circulation-member-side first protrusion portion insertion hole) 35a and a second-tube-side second protrusion portion insertion hole (a second-circulation-member-side second protrusion portion insertion hole) 35b. The second-tube-side first protrusion portion insertion hole 35a is disposed on an outer side of an arc-shaped portion of the circulation groove 49a (the second thick portion 54b). The second-tube-side second protrusion portion insertion hole 35b is disposed on an inner side of the arc-shaped portion of the circulation groove 49a (an inner side of the second constant thickness portion 54a in the radial direction). An inner diameter of the second-tube-side second protrusion portion insertion hole 35b is smaller than an inner diameter of the second-tube-side first protrusion portion insertion hole 35a.

The second second-tube 36 includes a second constant thickness portion 55a and a second thick portion 55b provided on an outer side of the circulation groove 49b in the radial direction. The second constant thickness portion 55a is formed in such a manner that a thickness thereof is kept approximately constant between an outer surface of the second second-tube 36 and the circulation groove 49b. The second thick portion 55b is formed in such a manner that a thickness thereof is thicker than the second constant thickness portion 55a between the outer surface of the second second-tube 36 and the circulation groove 49b. The second second-tube 36 includes a second-tube-side first protrusion portion (the first-circulation-member-side first protrusion portion) 36a and a second-tube-side second protrusion portion (the first-circulation-member-side second protrusion portion) 36b, which are a pair of protrusion portions protruding toward one side where the first second-tube 35 is located. The second-tube-side first protrusion portion 36a is disposed on an outer side of an arc-shaped portion of the circulation groove 49b (the second thick portion 55b). The second-tube-side second protrusion portion 36b is disposed on an inner side of the arc-shaped portion of the circulation groove 49b (an inner side of the second constant thickness portion 55a in the radial direction). The second-tube-side first protrusion portion 36a and the second-tube-side second protrusion portion 36b have identical shapes. Therefore, when the second tube 32 is assembled, the second-tube-side first protrusion portion 36a is fitted to the second-tube-side first protrusion portion insertion hole 35a in a clearance-fit manner, and the second-tube-side second protrusion portion 36b is press-fitted in the second-tube-side second protrusion portion insertion hole 35b.

[Clip]

Next, a configuration of the clip 25 will be described in detail.

Figure 12:
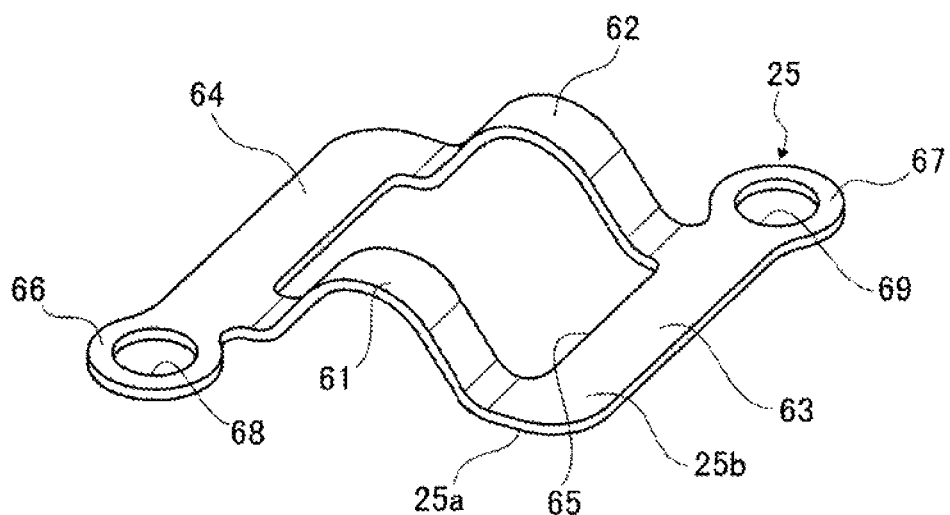
FIG. 12 is a perspective view of the clip 25.

FIG. 12 is a perspective view of the clip 25. The clip 25 is formed by press-molding of a plate-like material made of a metallic material, and is formed into a generally hollow square shape as viewed from the radial direction. The clip 25 is formed in such a manner that a burr generated at the time of the pressing is placed on an outer side in the radial direction. In other words, a direction in which the clip 25 is punched at the time of the press-molding is set to a direction extending from a radially inner surface 25a toward a radially outer surface 25b. The clip 25 includes a first circumferential connection portion 61, a second circumferential connection portion 62, a first axial connection portion 63, and a second axial connection portion 64. The first circumferential connection portion 61 extends in the circumferential direction of the nut 8, and is in abutment with the first thick portions 44b and 45b of the first circulation portion 38. The first circumferential connection portion 61 has such a curved shape that a central portion thereof in the circumferential direction protrudes outward in the radial direction along a shape of the outer surface of the first tube 31 when being viewed from the X-axis direction. As illustrated in FIG. 6, the first circumferential connection portion 61 is provided at a position offset in the X-axis positive direction with respect to the first flange portion 8a in the X-axis direction. The second circumferential connection portion 62 extends in the circumferential direction of the nut 8, and is in abutment with the second thick portions 54b and 55b of the second circulation portion 48. As illustrated in FIG. 6, the second circumferential connection portion 62 has such a curved shape that a central portion thereof in the circumferential direction protrudes outward in the radial direction along a shape of the outer surface of the second tube 32 when being viewed from the X-axis direction. The second circumferential connection portion 62 is provided at a position offset in the X-axis negative direction with respect to the second flange portion 8c in the X-axis direction. The first axial connection portion 63 extends in the X-axis direction on one side in the circumferential direction with respect to the tube 23, and connects the first circumferential connection portion 61 and the second circumferential connection portion 62. The second axial connection portion 64 extends in the X-axis direction on the other side in the circumferential direction with respect to the tube 23, and connects the first circumferential connection portion 61 and the second circumferential connection portion 62. The second axial connection portion 64 is provided in the same plane as the first axial connection portion 63. The clip 25 is formed in such a manner that lengths of the radially inner surface 25a from the first axial connection portion 63 and the second axial connection portion 64 to the circumferentially central portions (tops) of the first circumferential connection portion 61 and the second circumferential connection portion 62 fall below lengths from the first flat surface portion 28a and the second flat surface portion 28b to the outer surface of the tube 23, before the clip 25 is attached to the nut 8.

A penetration portion 65 penetrating in the radial direction of the nut 8 is provided inside a region surrounded by the first circumferential connection portion 61, the second circumferential connection portion 62, the first axial connection portion 63, and the second axial connection portion 63. A first circular portion 66 is provided on an end of the second axial connection portion 64 in the X-axis negative direction and on the X-axis negative direction side with respect to a position at which the second axial connection portion 64 is connected with the first circumferential connection portion 61. The first circular portion 66 is provided in the same plane as the second axial connection portion 64. The first circular portion 66 is in abutment with the first flat surface portion 28a of the first flange portion 8a. A first screw hole 68 is provided on the first circular portion 66. The first screw hole 68 is provided at a position facing the first female screw portion 26a of the first flat surface portion 28a. A second circular portion 67 is provided on an end of the first axial connection portion 63 in the X-axis positive direction and on the X-axis positive direction side with respect to a position at which the first axial connection portion 63 is connected with the second circumferential connection portion 62. The second circular portion 67 is provided in the same plane as the first axial connection portion 63. The second circular portion 67 is in abutment with the second flat surface portion 28a of the second flange portion 8c. A second screw hole 69 is provided on the second circular portion 67. The second screw hole 69 is provided at a position facing the second female screw portion 26b of the second flat surface portion 28b.

Next, a method for assembling the tube 23 will be described.

First, the first tube 31 and the second tube 32 are assembled. To assemble the first tube 31, the first-tube-side first protrusion portion 34a and the first-tube-side second protrusion portion 34b of the second first-tube 34 are inserted in the first-tube-side first protrusion portion insertion hole 33a and the first-tube-side second protrusion portion insertion hole 33b of the first first-tube 33, respectively. At this time, the first-tube-side first protrusion portion 34a is fitted to the first-tube-side first protrusion portion insertion hole 33a in the clearance-fit manner, and the first-tube-side second protrusion portion 34b is press-fitted in the first-tube-side second protrusion portion insertion hole 33b. This assembling allows accuracy of an assembling position to be secured on the press-fitting side (33b and 34b) while allowing a manufacturing error to be absorbed on the clearance-fit side (33a and 34a). The second tube 32 is also assembled in a similar manner.

Next, the first tube 31 is attached to the nut 8. The first insertion portion 37 is inserted in the first connection passage 21, and the first arc-shaped portion 31a is brought into abutment with the outer peripheral surface of the main body portion 8b. A relative movement of the first tube 31 inward in the radial direction relative to the nut 8 can be restricted due to the abutment between the first arc-shaped portion 31a and the main body portion 8b. Further, a relative movement of the first tube 31 in the X-axis direction relative to the nut 8 can be restricted due to the abutment between the inner peripheral surface of the first connection passage 21 and both the protrusion portions 37c and 37d of the first insertion portion 37. Further, both the protrusion portions 37c and 37d are compressed and deformed in the X-axis direction in the first connection passage 21, so that rattling of the first insertion portion 37 can be prevented or reduced in the first connection passage 21. Both the protrusion portions 37c and 37c are easily elastically deformed, so that the rattling can be effectively prevented or reduced. In addition, the flat surface portions 37a and 37b are provided around both the protrusion portions 37c and 37d, so that interference can be prevented or reduced between the flat surface portions 37a and 37b and the inner peripheral surface of the first connection passage 21. As a result, the position of the first insertion portion 37 in the X-axis direction relative to the first connection passage 21 can be restricted only by both the protrusion portions 37c and 37d, so that the position in the X-axis direction can be restricted with improved accuracy.

Next, the second tube 32 is attached to the nut 8. The second insertion portion 47 is inserted in the second connection passage 22, and the second arc-shaped portion 38a is brought into abutment with the outer peripheral surface of the main body portion 8b. A relative movement of the second tube 32 inward in the radial direction relative to the nut 8 can be restricted due to the abutment between the second arc-shaped portion 38a and the main body portion 8b. Further, a relative movement of the second tube 32 in the X-axis direction relative to the nut 8 can be restricted due to the abutment between the inner peripheral surface of the second connection passage 22 and both the protrusion portions 47c and 47d of the second insertion portion 47. Further, both the protrusion portions 47c and 47d are compressed and deformed in the X-axis direction in the second connection passage 22, so that rattling of the second insertion portion 47 can be prevented or reduced in the second connection passage 22. Both the protrusion portions 47c and 47d are easily elastically deformed, so that the rattling can be effectively prevented or reduced. In addition, the flat surface portions 47a and 47b are provided around both the protrusion portions 47c and 47d, so that interference is prevented or reduced between the flat surface portions 47a and 47b and the inner peripheral surface of the second connection passage 22. As a result, the position of the second insertion portion 47 in the X-axis direction relative to the second connection passage 22 can be restricted only by both the protrusion portions 47c and 47d, so that the position in the X-axis direction can be restricted with improved accuracy.

Further, the first first-tube-side abutment portion 40 is provided on one side corresponding to the direction in which the second insertion portion 47 is inserted in the second connection passage (the other side in the circumferential direction) with respect to the second second-tube-side abutment portion 51, and the first second-tube-side abutment portion 50 is provided on the other side corresponding to the direction in which the first insertion portion 37 is inserted in the first connection passage 21 (the one side in the circumferential direction) with respect to the second first-tube-side abutment portion 41. This means that the first second-tube-side abutment portion 50 and the second second-tube-side abutment portion 51 do not abut against the second first-tube-side abutment portion 41 and the first first-tube-side abutment portion 40 until the insertion of the second insertion portion 47 into the second connection passage 22 is completed. Therefore, the first tube 31 can be prevented from interfering and impeding the assembling when the second tube 32 is attached to the nut 8. Similar effects can also be achieved in a case where the tubes are attached to the nut 8 in an order of the second tube 32 and the first tube 31.

Lastly, the clip 25 is attached to the nut 8. The first screw member 27a and the second screw member 27b are screwed into the first female screw portion 26a and the second female screw portion 26b with the first screw hole 68 and the second screw hole 69 of the clip 25 and the first female screw portion 26a and the second female screw portion 26b of the nut 8 in alignment with each other, respectively. The first tube 31 and the second tube 32 are biased inward in the radial direction of the nut 8 by the first circumferential connection portion 61 and the second circumferential connection portion 62 due to an elastic deformation of the clip 25. They are biased toward one side where the nut 8 is located. The biasing force can be applied to the first tube 31 and the second tube 32 from both sides in the circumferential direction due to the first circumferential connection portion 61 and the second circumferential connection portion 62, so that the first tube 31 and the second tube 32 can be held with an improved force.

Figure 13:
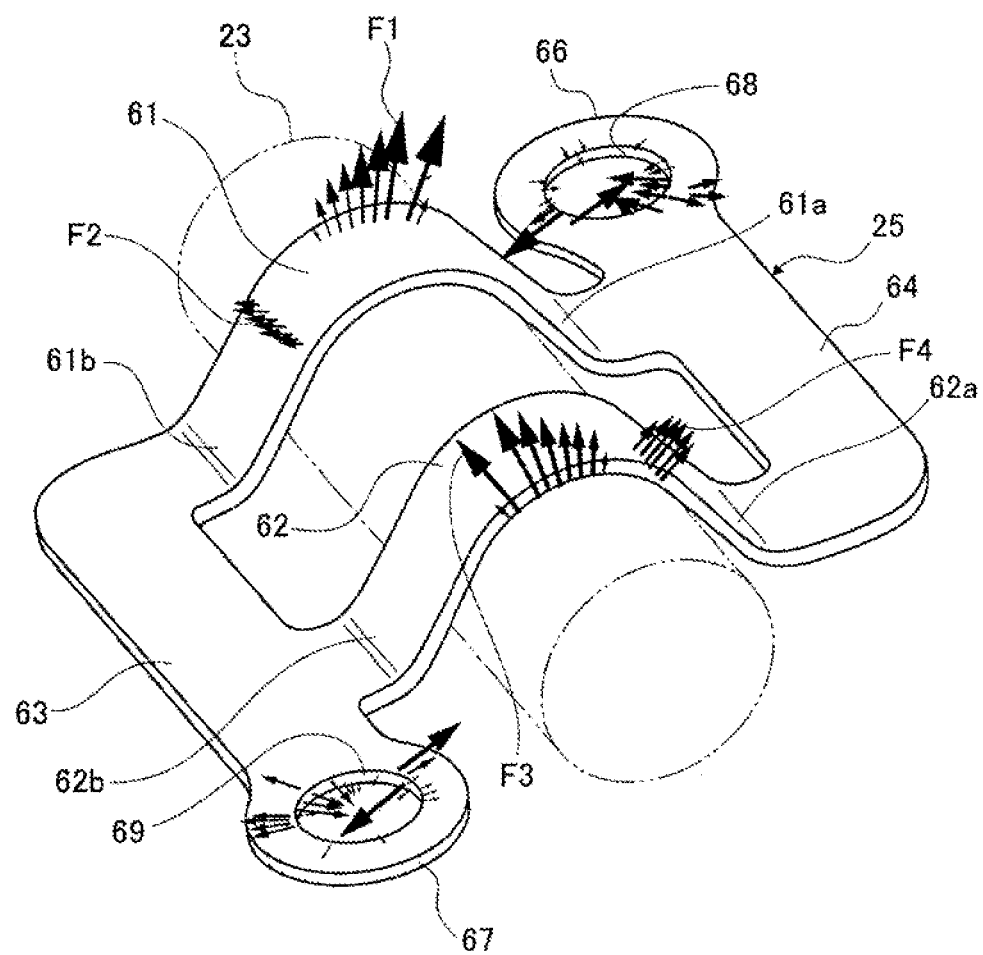
FIG. 13 is a schematic view illustrating a distribution of forces applied to the clip 25.

FIG. 13 is a schematic view illustrating a distribution of forces applied to the clip 25.

The first circumferential connection portion 61 has one end side 61*b* and the other end side 61*a* as both ends thereof in the circumferential direction. The other end side 61*a* is located close to the first circular portion 66, which is the position where the first screw member 27*a* is fastened. The one end side 61*b* is located away from the second circular portion 67, which is the position where the second screw member 27*b* is fastened. Therefore, on the first circumferential connection portion 61, a force F1 applied to the other side in the circumferential direction is stronger than a force F2 applied to the one side in the circumferential direction. In other words, the first circumferential connection portion 61 fastens the first tube 31 with a stronger force on the other side in the circumferential direction (a reaction force of F1) than on the one side in the circumferential direction (a reaction force of F2), so that the first tube 31 is biased toward the one side in the circumferential direction. On the other hand, the second circumferential connection portion 62 has one end side 62*b* and the other end side 62*a* as both ends thereof in the circumferential direction. The one end side 62*b* is located close to the second circular portion 67, which is the position where the second screw member 27*b* is fastened. The other end side 62*a* is located away from the first circular portion 66, which is the position where the first screw member 27*a* is fastened. Therefore, on the second circumferential connection portion 62, a force F3 applied to the one side in the circumferential direction is stronger than a force F4 applied to the other side in the circumferential direction. In other words, the second circumferential connection portion 61 fastens the second tube 32 with a stronger force on the one side in the circumferential direction (a reaction force of F3) than on the other side in the circumferential direction (a reaction force of F4), so that the second tube 32 is biased toward the other side in the circumferential direction.

In other words, the clip 25 biases the first tube 31 and the second tube 32 in a direction in which the circumferential abutment portions of the first tube 31 and the second tube 32 (the first first-tube-side abutment portion 40 and the second second-tube-side abutment portion 51, and the second first-tube-side abutment portion 41 and the first second-tube-side abutment portion 50) are pressed against each other in the circumferential direction. By this configuration, both the relative movements of the first tube 31 and the second tube 32 in the circumferential direction relative to the nut 8 are restricted, so that the first tube 31 and the second tube 32 can be positioned relative to each other with improved accuracy.

The electric power steering apparatus according to the first embodiment brings about the following advantageous effects.

The first first-tube-side abutment portion 40 of the first tube 31 and the second second-tube-side abutment portion 51 of the second tube 32 are in abutment with each other in the circumferential direction of the nut 8, and the second first-tube-side abutment portion 41 of the first tube 31 and the first second-tube-side abutment portion 50 of the second tube 32 are in abutment with each other in the circumferential direction of the nut 8. By this configuration, both the relative movement of the first tube 31 toward the one side in the circumferential direction relative to the nut 8 and the relative movement of the second tube 32 toward the other side in the circumferential direction relative to the nut 8 are restricted, so that the first tube 31 and the second tube 32 can be positioned relative to each other with the improved accuracy. As a result, the balls 16 can smoothly circulate in the tube 23 (the circulation passage 24).

Further, the first runout portion 31*b* and the second runout portion 32*b* are provided on the first tube 31 and the second tube 32 at the positions facing the first rounded portion 8*d* and the second rounded portion 8*e* of the nut 8, respectively, so that an increase in a radial dimension in the assembled state can be prevented or cut down due to the abutment of the first tube 31 and the second tube 32 with the first rounded portion 8*d* and the second rounded portion 8*e*, respectively. In other words, a reduction in the radial dimension can be realized with the first tube 31 and the second tube 32 attached to the nut 8.

The first first-tube 33 has the identical shape to the first second-tube 35, and the second first-tube 34 has the identical shape to the second second-tube 36. Therefore, the number of components can be reduced and a cost reduction can be achieved, compared to when they have individually different shapes from each other.

The second first-tube-side abutment portion 41 and the second second-tube-side abutment portion 51 are provided in the same plane as the first division surface 42 and the second division surface 52. By this configuration, the shapes of the first tube 31 and the second tube 32 can be simplified compared to when the second first-tube-side abutment portion 41 and the second second-tube-side abutment portion 51 are separately formed.

The first division surface 42 and the second division surface 52 of the first tube 31 and the second tube 32 pass through the approximately central points of the circular cross sections of the first ball circulation passage 39 and the second ball circulation passage 49, respectively. An offset of the division surface from the approximately central point of the circular cross section would lead to formation of an undercut portion on a member on one side, thereby making the disposition of the balls 16 difficult and also necessitating time and effort at the time of the molding. The first division surface 42 and the second division surface 52 are formed so as to pass through the approximately central points of the circular cross sections, which can facilitate the disposition of the balls 16 and reduce the time and effort at the time of the molding.

The first division surface 42 and the second division surface 52 are provided at the positions offset from the points 43 and 53 farthest away from the rotational axis O of the nut 8 in the first ball circulation passage 39 and the second circulation passage 49, respectively. The points 43 and 53 are points that receive a heaviest load from the balls 16, and therefore the offset of the first division surface 42 and the second division surface 52 from the points 43 and 53 can prevent or reduce the application of the heavy load on the first division surface 42 and the second division surface 52.

In the power steering apparatus according to the first embodiment, the radially inner ends P1 and P3 of the first end surface abutment portion 21*c* and the second end surface abutment portion 22*c*, which the end surfaces 37*e* and 47*e* of the first insertion portion 37 and the second insertion portion 47 are in abutment with, respectively, are positioned on the inner side in the radial direction with respect to the radially inner ends P2 and P4 of the end surface 37e. In other words, steps at boundary portions between the first insertion portion 37 and the second insertion portion 47 and the nut-side ball screw groove 13 are provided so as to be oriented toward one side where the first insertion portion 37 is located and one side where the second insertion portion 47 is located, respectively. By this configuration, the balls 16 can smoothly flow from the nut-side ball screw groove 13 toward the first insertion portion 37 and the second insertion portion 47.

The nut-side ball screw groove 13 is formed in such a manner that the number of windings of the nut-side ball screw groove 13 in the counterclockwise direction from the first inner peripheral-side opening portion 21b to the second inner peripheral-side opening portion 22b has the value after the decimal point that is larger than 0.5. By this configuration, the first connection passage 21 and the second connection passage 22 are connected to each other via the first tube 31 and the second tube 32 over a narrower circumferential range, so that, when each of the first tube 31 and the second tube 32 is formed separately by the molding, the division surface 42 thereof can be easily formed into a flat surface and manufacturability can be improved.

The first circumferential connection portion 61 and the second circumferential connection portion 62 of the clip 25 are provided at the positions offset in the X-axis positive direction and the X-axis negative direction from the first flange portion 8a and the second flange portion 8c in the X-axis direction, respectively. By this configuration, the interference can be prevented or reduced between the first flange portion 8a and the second flange portion 8c, and the first circumferential connection portion 61 and the second circumferential connection portion 62, respectively.

The first female screw portion 26a and the second female screw portion 26b are disposed on the first flat surface portion 28a and the second flat surface portion 28b provided in the same plane, respectively. By this configuration, the first tube 31 and the second tube 32 can apply even biasing forces to the first circumferential connection portion 61 and the second circumferential connection portions 62, respectively.

The first circumferential connection portion 61 and the second circumferential connection portion 62 are in abutment with the first thick portions 44b and 45b of the first tube 31 and the second thick portions 54b and 55b of the second tube 32, respectively. By this configuration, durability of the first tube 31 and the second tube 32 can be improved compared to when the first circumferential connection portion 61 and the second circumferential connection portion 62 are in abutment with the first constant thickness portion 44a and the second constant thickness portion 45a, respectively.

The clip 25 includes the penetration portion 65 penetrating in the radial direction of the nut 8. The biasing force is not generated on the penetrating portion 65, which contributes to preventing or reducing excessive application of the biasing force from the clip 25 to the first tube 31 and the second tube 32.

The burr generated when the clip 25 is processed by the press-molding is formed on the radially outer surface 25b of the clip 25. In other words, there is not the burr on the radially inner surface 25a in contact with the first tube 31 and the second tube 32, which contributes to preventing or reducing damage of the first tube 31 and the second tube 32 due to the burr.

Other Embodiments

Having described the embodiment for implementing the present invention, the specific configuration of the present invention is not limited to the configuration of the embodiment, and the present invention also includes a design modification and the like thereof made within a range that does not depart from the spirit of the present invention.

The power steering apparatus may include one pair of the first-circulation-member-side abutment portion and the second-circulation-member-side abutment portion, or three or more pairs of the first-circulation-member-side abutment portions and the second-circulation-member-side abutment portions.

The shapes and the materials of the first axial position restriction portion and the second axial position restriction portion may be arbitrarily selected.

The first circulation member and the second circulation member may have different shapes from each other.

The inner diameter of the first-circulation-member-side first protrusion portion insertion hole may be smaller than the inner diameter of the first-circulation-member-side second protrusion portion insertion hole. Alternatively, the first-circulation-member-side first protrusion portion insertion hole and the first-circulation-member-side second protrusion portion insertion hole may have equal inner diameters to each other, and the first-circulation-member-side first protrusion portion and the second-circulation-member-side protrusion portion may have different outer diameters from each other.

In the following description, technical ideas recognizable from the above-described embodiment will be described together with advantageous effects thereof.

(1) As a first configuration, a power steering apparatus includes a wheel turning shaft (rack) configured to turn a turning target wheel by axially moving according to a rotation of a steering wheel; a wheel turning shaft-side ball screw groove provided on an outer peripheral side of the wheel turning shaft and having a helically grooved shape; a nut including a main body portion formed annularly so as to surround the wheel turning shaft and provided rotatably relative to the wheel turning shaft; a nut-side ball screw groove provided on an inner peripheral side of the nut, having a helically grooved shape, and forming a helical ball circulation groove together with the wheel turning shaft-side ball screw groove; a plurality of balls provided movably in the ball circulation groove; a first connection passage provided on the nut and connecting a first outer peripheral-side opening portion opened on an outer peripheral surface of the nut and a first inner peripheral-side opening portion located at a position offset from the first outer peripheral-side opening portion in a direction around a rotational axis of the nut and opened on an inner peripheral surface of the nut; a second connection passage provided on the nut and connecting a second inner peripheral-side opening portion opened on the inner peripheral surface of the nut and provided on an opposite side of the first outer peripheral-side opening portion from the first inner peripheral-side opening portion in the direction around the rotational axis of the nut and a second outer peripheral-side opening portion opened on the outer peripheral surface of the nut and provided between the first inner peripheral-side opening portion and the second inner peripheral-side opening portion in the direction around the rotational axis of the nut; a first circulation member including a first insertion portion configured to be inserted in the first connection passage, a first circulation portion formed so as to extend from one side where the first outer peripheral-side opening portion is located to an intermediate position between the first outer peripheral-side opening portion and the second outer peripheral-side opening portion, and a first ball circulation passage through which the plurality of balls passes; a second circulation member including a second insertion portion configured to be inserted in the second connection passage, a second circulation passage formed so as to extend from one side where the second outer peripheral-side opening portion is located to an intermediate position between the second outer peripheral-side opening portion and the first outer peripheral-side opening portion, and a second ball circulation passage through which the plurality of balls passes, and configured to allow the plurality of balls to move between the first inner peripheral-side opening portion and the second inner peripheral-side opening portion via the first circulation passage and the second circulation passage; a first-circulation-member-side abutment portion and a second-circulation-member-side abutment portion that are at least one pair of abutment portions respectively formed on the first circulation member and the second circulation member and are configured in such a manner that the on the first-circulation-member-side abutment portion and the second-circulation-member-side abutment portion abut against each other so as to face each other in the direction around the rotational axis of the nut to restrict relative positions of the first circulation member and the second circulation member in the direction around the rotational axis of the nut; and an electric motor configured to rotationally drive the nut and provide a steering force to the wheel turning shaft by a conversion of the rotation of the nut into the axial movement of the wheel turning shaft.

According to this configuration, although the first circulation member and the second circulation member are formed by different components from each other and therefore may be located at misaligned relative positions in the circumferential direction of the nut and affect the circulation of the balls due to this misalignment, the accuracy of the relative positions of the first and second circulation members is improved and the balls can smoothly circulate due to the provision of the first-circulation-member-side abutment portion and the second-circulation-member-side abutment portion configured to restrict the relative positions of the first circulation member and the second circulation member in the circumferential direction.

(2) As a second configuration, in the power steering apparatus according to the above-described first configuration, the first-circulation-member-side abutment portion includes a first first-circulation-member-side abutment portion and a second first-circulation-member-side abutment portion provided at positions spaced apart from each other in the direction around the rotational axis of the nut. The first first-circulation-member-side abutment portion is formed so as to extend generally in parallel with a direction in which the second insertion portion is inserted in the second connection passage. The second-circulation-member-side abutment portion includes a first second-circulation-member-side abutment portion and a second second-circulation-member-side abutment portion. The first second-circulation-member-side abutment portion is configured to abut the second first-circulation-member-side abutment portion so as to face the second first-circulation-member-side abutment portion. The second second-circulation-member-side abutment portion is configured to abut the first first-circulation-member-side abutment portion so as to face the first first-circulation-member-side abutment portion. The first second-circulation-member-side abutment portion is formed so as to extend generally in parallel with a direction in which the first insertion portion is inserted in the first connection passage.

According to this configuration, the first first-circulation-member-side abutment portion and the first second-circulation-member-side abutment portion extend generally in conformity with the directions in which the second insertion portion and the first insertion portion are inserted, respectively, and therefore are prevented from impeding the attachment of the second circulation member and the first circulation member, respectively.

(3) As a third configuration, in the power steering apparatus according to the above-described second configuration, the first ball circulation passage and the second circulation passage are each formed so as to have a circular cross section. The first circulation member includes a first first-circulation member and a second first-circulation member. The first first-circulation member is provided on one side of a first division surface passing through an approximately central point of the circular cross section of the first ball circulation passage. The second first-circulation member is provided on the other side of the first division surface. The second circulation member includes a first second-circulation member and a second second-circulation member. The first second-circulation member is provided on one side of a second division surface passing through an approximately central point of the circular cross section of the second ball circulation passage. The second second-circulation member is provided on the other side of the second division surface.

According to this configuration, the balls can be easily disposed with each of the first and second circulation members divided along the division surface. (in a case where the division surface is offset from the center of the circular cross section, the undercut portion would be formed on the member on one side, which would make the disposition of the balls difficult.)

(4) As a fourth configuration, in the power steering apparatus according to the above-described third configuration, the first division surface is provided at a position offset from a point farthest away from the rotational axis of the nut in the first ball circulation passage. The second division surface is provided at a position offset from a point farthest away from the rotational axis of the nut in the second ball circulation passage.

According to this configuration, the division surfaces are each offset from the outermost peripheral portion, which is the point where the heaviest load is imposed from the balls in the first or second ball circulation passage, so that the application of a heavy load on the division surface can be prevented or reduced.

(5) As a fifth configuration, in the power steering apparatus according to the above-described second configuration, the first ball circulation passage and the second circulation passage are each formed so as to have a circular cross section. The first circulation member includes a first first-circulation member and a second first-circulation member. The first first-circulation member is provided on one side of a first division surface dividing the circular cross section of the first ball circulation passage. The second first-circulation member is provided on the other side of the first division surface. The second first-circulation-member-side abutment portion is formed in the same plane as the first division surface. The second circulation member includes a first second-circulation member and a second second-circulation-member-side member. The first-second circulation member is provided on one side of a second division surface dividing the circular cross section of the second ball circulation passage. The second second-circulation member-side member is provided on the other side of the second division surface. The second second-circulation-member-side abutment portion is formed in the same plane as the second division surface.

According to this configuration, the first division surface and the second division surface, and the second first-circulation-member-side abutment portion and the second second-circulation-member-side abutment portion are formed in the same plane as each other, respectively, so that the shapes of the first and second circulation members can be simplified.

(6) As a sixth configuration, in the power steering apparatus according to the above-described fifth configuration, one of the first first-circulation member and the second second-circulation member includes a first-circulation-member-side first protrusion portion and a first-circulation-member-side second protrusion portion that are at least one pair of protrusion portions protruding toward the other of the first first-circulation member and the second second-circulation member, and the other of the first first-circulation member and the second second-circulation member includes a first-circulation-member-side first protrusion portion insertion hole and a first-circulation-member-side second protrusion portion insertion hole. The first-circulation-member-side first protrusion portion insertion hole is configured to be fitted to the first-circulation-member-side first protrusion portion in a clearance-fit manner by insertion of the first-circulation-member-side first protrusion portion therein. The first-circulation-member-side second protrusion portion insertion hole is configured to allow the first-circulation-member-side second protrusion portion to be press-fitted therein. One of the first second-circulation member and the second second-circulation member includes a second-circulation-member-side first protrusion portion and a second-circulation-member-side second protrusion portion that are at least one pair of protrusion portions protruding toward the other of the first second-circulation member and the second second-circulation member, and the other of the first second-circulation member and the second-second circulation member includes a second-circulation-member-side first protrusion portion insertion hole and a second-circulation-member-side second protrusion portion insertion hole. The second-circulation-member-side first protrusion portion insertion hole is configured to be fitted to the second-circulation-member-side first protrusion portion in a clearance-fit manner by insertion of the second-circulation-member-side first protrusion portion therein. The second-circulation-member-side second protrusion portion insertion hole is configured to allow the second-circulation-member-side second protrusion portion to be press-fitted therein.

According to this configuration, the accuracy of the assembling position can be secured on the press-fitting side while the manufacturing error can be absorbed on the clearance-fit side.

(7) As a seventh configuration, in the power steering apparatus according to the above-described first configuration, the first connection passage includes, at an end portion thereof on one side where the first inner peripheral-side opening portion is located, a first end surface abutment portion which an end surface of the first insertion portion opposite from the first circulation portion is in abutment with. The first end surface abutment portion is formed in such a manner that, in a radial direction of the rotational axis of the nut, a portion of the first end surface abutment portion that is located on an innermost side in the radial direction is positioned on an inner side in the radial direction with respect to an entire area of the end surface of the first insertion portion in abutment with the first end surface abutment portion. The second connection passage includes, at an end portion thereof on one side where the second inner peripheral-side opening portion is located, a second end surface abutment portion which an end surface of the second insertion portion opposite from the second circulation portion is in abutment with. The second end surface abutment portion is formed in such a manner that, in the radial direction of the rotational axis of the nut, a portion of the second end surface abutment portion that is located on the innermost side in the radial direction is positioned on the inner side in the radial direction with respect to an entire area of the end surface of the second insertion portion in abutment with the second end surface abutment portion.

According to this configuration, the abutment surfaces of the first and second insertion portions are located at positions lower than the inner peripheral surface of the nut-side ball screw groove (the outer side in the radial direction), so that the balls can smoothly flow at the boundary portions between the first and second insertion portions and the nut-side ball screw groove.

(8) As an eighth configuration, in the power steering apparatus according to the above-described first configuration, the first circulation member includes a first radial position restriction portion provided on an inner side in a radial direction of the rotational axis of the nut and provided in abutment with a surface of the nut on an outer side in the radial direction. The second circulation member includes a second radial position restriction portion provided on the inner side in the radial direction of the rotational axis of the nut and provided in abutment with the surface of the nut on the outer side in the radial direction.

According to this configuration, the positions of the first and second circulation members in the radial direction relative to the nut can be restricted.

(9) As a ninth configuration, in the power steering apparatus according to the above-described first configuration, the first insertion portion includes a first axial position restriction portion configured to restrict a relative movement in a direction along the rotational axis of the nut relative to the first connection passage. The second insertion portion includes a second axial position restriction portion configured to restrict a relative movement in the direction along the rotational axis of the nut relative to the second connection passage.

According to this configuration, the positions of the first and second circulation members in the axial direction relative to the nut can be restricted.

(10) As a tenth configuration, in the power steering apparatus according to the above-described ninth configuration, the first insertion portion is inserted in the first connection passage with the first axial position restriction portion compressed and deformed in the first connection passage. The second insertion portion is inserted in the second connection passage with the second axial position restriction portion compressed and deformed in the second connection passage.

According to this configuration, the rattling of the first and second insertion portions can be prevented or reduced in the first and second connection passages, respectively.

(11) As an eleventh configuration, in the power steering apparatus according to the above-described tenth configuration, the first axial position restriction portion is protrusion portions provided on both sides of the first insertion portion in the direction along the rotational axis of the nut. The second axial position restriction portion is protrusion portions provided on both sides of the second insertion portion in the direction along the rotational axis of the nut.

According to this configuration, the provision of the protrusion portions as the first and second axial position restriction portions facilitates the elastic deformations of these protrusion portions and contributes to effectively preventing or reducing the rattling of the first and second insertion portions in the first and second connection passages, respectively.

(12) As a twelfth configuration, in the power steering apparatus according to the above-described eleventh configuration, the first insertion portion includes a pair of flat surface portions generally orthogonal to the direction along the rotational axis of the nut on the both sides in the direction along the rotational axis of the nut, and the first axial position restriction portion, which is the protrusion portions, is provided on the flat surface portions of the first insertion portion. The second insertion portion includes a pair of flat surface portions generally orthogonal to the direction along the rotational axis of the nut on the both sides in the direction along the rotational axis of the nut, and the second axial position restriction portion, which is the protrusion portions, is provided on the flat surface portions of the second insertion portion.

According to this configuration, the provision of the flat surface portions around the protrusion portions contributes to preventing or reducing the interference of the flat surface portions with the inner peripheral surfaces of the first and second insertion portions. As a result, the positions of the first and second insertion portions in the axial direction relative to the first and second connection passages can be restricted only by the protrusion portions, so that the positions in the axial direction can be restricted with improved accuracy.

(13) As a thirteenth configuration, in the power steering apparatus according to the above-described first configuration, the nut includes a main body portion provided at an intermediate portion in a direction along the rotational axis of the nut, a first flange portion and a second flange portion that are a pair of flange portions provided on both sides of the main body portion in a direction along the rotational axis of the nut and protruding outward in a radial direction of the rotational axis of the nut, a first rounded portion provided between the main body portion and the first flange portion and formed in an arc-like manner so that a dimension of an outer diameter in the radial direction of the rotational axis of the nut gradually increases from one side where the main body portion is located toward the other side where the first flange portion is located, and a second rounded portion provided between the main body portion and the second flange portion and formed in an arc-like manner so that a dimension of an outer shape in the direction of the rotational axis of the nut gradually increases from one side where the main body portion is located toward the other side where the second flange portion is located. The first circulation member includes a first runout portion formed so as to be separated from the first rounded portion at a portion facing the first rounded portion. The second circulation member includes a second runout portion formed so as to be separated from the second rounded portion at a portion facing the second rounded portion.

According to this configuration, the first and second rounded portions and the first and second circulation members are prevented from interfering with each other, respectively, so that the radial dimension can be reduced with the first and second circulation members attached to the nut.

(14) As a fourteenth configuration, the power steering apparatus according to the above-described first configuration further includes a fixation member configured to fix the first circulation member and the second circulation member to the nut. The fixation member is provided so as to generate a force in a direction in which the first-circulation-member-side abutment portion and the second-circulation-member-side abutment portion are pressed against each other.

According to this configuration, the accuracy of the relative positions of the first circulation member and the second circulation member can be further improved.

(15) As a fifteenth configuration, in the power steering apparatus according to the above-described fourteenth configuration, the fixation member biases the first circulation member and the second circulation member inward in a radial direction of the rotational axis of the nut.

According to this configuration, the accuracy of the positions of the first and second circulation members in the radial direction can be improved.

(16) As a sixteenth configuration, in the power steering apparatus according to the above-described first configuration, the nut-side ball screw groove is formed in such a manner that the number of windings of the nut-side ball screw groove from the first inner peripheral-side opening portion to the second inner peripheral-side opening portion has a value after a decimal point that is larger than 0.5.

According to this configuration, the first connection passage and the second connection passage are connected to each other via the first circulation member and the second circulation member over a narrower circumferential range, so that, when each of the first circulation member and the second circulation member is separately formed by the molding, the division surface thereof can be easily formed into the flat surface and the manufacturability can be improved.

Having described merely several embodiments of the present invention, it is apparent to those skilled in the art that the embodiments described as the examples can be modified or improved in various manners without substantially departing from the novel teachings and advantages of the present invention. Therefore, such a modified or improved embodiment is intended to be also contained in the technical scope of the present invention.

The present application claims priority to Japanese Patent Application No. 2016-048585 filed on Mar. 11, 2016. The entire disclosure of Japanese Patent Application No. 2016-048585 filed on Mar. 11, 2016 including the specification, the claims, the drawings, and the abstract is incorporated herein by reference in its entirety.

The entire disclosure of Japanese Patent Application Public Disclosure No. 2015-47997 (PTL 1) including the specification, the claims, the drawings, and the abstract is incorporated herein by reference in its entirety.

REFERENCE SIGN LIST

O rotational axis
1 power steering apparatus
4 rack bar (wheel turning shaft)
6 electric motor
8 nut
13 nut-side ball screw groove
14 rack bar-side ball screw groove (wheel turning-side ball screw groove)
16 ball
21 first connection passage
21a first outer peripheral-side opening portion 21b first inner peripheral-side opening portion
22 second connection passage
22a second outer peripheral-side opening portion
22b second inner peripheral-side opening portion
33 first first-tube (first first-circulation member)
34 second first-tube (second first-circulation member)
35 first second-tube (first second-circulation member)
36 second second-tube (second second-circulation member)
37 first insertion portion
38 first circulation portion
39 first ball circulation passage
40 first first-tube-side abutment portion (first first-circulation-member-side abutment portion)
41 second first-tube-side abutment portion (second first-circulation-member-side abutment portion)
42 first division surface
47 second insertion portion
48 second circulation portion
49 second ball circulation passage
50 first second-tube-side abutment portion (first second-circulation-member-side abutment portion)
51 second second-tube-side abutment portion (second second-circulation-member-side abutment portion)
52 second division surface

The invention claimed is:

1. A power steering apparatus comprising:
a wheel turning shaft configured to turn a turning target wheel by axially moving according to a rotation of a steering wheel;
a wheel turning shaft-side ball screw groove provided on an outer peripheral side of the wheel turning shaft and having a helically grooved shape;
a nut including a main body portion formed annularly so as to surround the wheel turning shaft, the nut being provided rotatably relative to the wheel turning shaft;
a nut-side ball screw groove provided on an inner peripheral side of the nut, having a helically grooved shape, and forming a helical ball circulation groove together with the wheel turning shaft-side ball screw groove;
a plurality of balls provided movably in the ball circulation groove;
a first connection passage provided on the nut, and connecting a first outer peripheral-side opening portion and a first inner peripheral-side opening portion, the first outer peripheral-side opening portion being opened on an outer peripheral surface of the nut, the first inner peripheral-side opening portion being located at a position offset from the first outer peripheral-side opening portion in a direction around a rotational axis of the nut and being opened on an inner peripheral surface of the nut;
a second connection passage provided on the nut, and connecting a second inner peripheral-side opening portion and a second outer peripheral-side opening portion, the second inner peripheral-side opening portion being opened on the inner peripheral surface of the nut and provided on an opposite side of the first outer peripheral-side opening portion from the first inner peripheral-side opening portion in the direction around the rotational axis of the nut, the second outer peripheral-side opening portion being opened on the outer peripheral surface of the nut and provided between the first inner peripheral-side opening portion and the second inner peripheral-side opening portion in the direction around the rotational axis of the nut;
a first circulation member including a first insertion portion configured to be inserted in the first connection passage, a first circulation portion formed so as to extend from one side where the first outer peripheral-side opening portion is located to an intermediate position between the first outer peripheral-side opening portion and the second outer peripheral-side opening portion, and a first ball circulation passage through which the plurality of balls passes;
a second circulation member including a second insertion portion configured to be inserted in the second connection passage, a second circulation passage formed so as to extend from one side where the second outer peripheral-side opening portion is located to an intermediate position between the second outer peripheral-side opening portion and the first outer peripheral-side opening portion, and a second ball circulation passage through which the plurality of balls passes, the second circulation member being configured to allow the plurality of balls to move between the first inner peripheral-side opening portion and the second inner peripheral-side opening portion via the first circulation passage and the second circulation passage;
a first-circulation-member-side abutment portion and a second-circulation-member-side abutment portion that are at least one pair of abutment portions respectively formed on the first circulation member and the second circulation member, the first-circulation-member-side abutment portion and the second-circulation-member-side abutment portion being configured in such a manner that the first-circulation-member-side abutment portion and the second-circulation-member-side abutment portion abut against each other so as to face each other in the direction around the rotational axis of the nut to restrict relative positions of the first circulation member and the second circulation member in the direction around the rotational axis of the nut; and
an electric motor configured to rotationally drive the nut and provide a steering force to the wheel turning shaft by a conversion of the rotation of the nut into the axial movement of the wheel turning shaft.

2. The power steering apparatus according to claim 1, wherein the first-circulation-member-side abutment portion includes a first first-circulation-member-side abutment portion and a second first-circulation-member-side abutment portion provided at positions spaced apart from each other in the direction around the rotational axis of the nut,
wherein the first first-circulation-member-side abutment portion is formed so as to extend generally in parallel with a direction in which the second insertion portion is inserted in the second connection passage,
wherein the second-circulation-member-side abutment portion includes a first second-circulation-member-side abutment portion and a second second-circulation-member-side abutment portion, the first second-circulation-member-side abutment portion being configured to abut the second first-circulation-member-side abutment portion so as to face the second first-circulation-member-side abutment portion, the second second-circulation-member-side abutment portion being configured to abut the first first-circulation-member-side abutment portion so as to face the first first-circulation-member-side abutment portion, and
wherein the first second-circulation-member-side abutment portion is formed so as to extend generally in parallel with a direction in which the first insertion portion is inserted in the first connection passage.

3. The power steering apparatus according to claim 2, wherein the first ball circulation passage and the second circulation passage are each formed so as to have a circular cross section,
  wherein the first circulation member includes a first first-circulation member and a second first-circulation member, the first first-circulation member being provided on one side of a first division surface passing through an approximately central point of the circular cross section of the first ball circulation passage, the second first-circulation member being provided on an opposite side of the first division surface, and
  wherein the second circulation member includes a first second-circulation member and a second second-circulation member, the first second-circulation member being provided on one side of a second division surface passing through an approximately central point of the circular cross section of the second ball circulation passage, the second second-circulation member being provided on an opposite side of the second division surface.

4. The power steering apparatus according to claim 3, wherein the first division surface is provided at a position offset from a point farthest away from the rotational axis of the nut in the first ball circulation passage, and
  wherein the second division surface is provided at a position offset from a point farthest away from the rotational axis of the nut in the second ball circulation passage.

5. The power steering apparatus according to claim 2, wherein the first ball circulation passage and the second circulation passage are each formed so as to have a circular cross section,
  wherein the first circulation member includes a first first-circulation member and a second first-circulation member, the first first-circulation member being provided on one side of a first division surface dividing the circular cross section of the first ball circulation passage, the second first-circulation member being provided on an opposite side of the first division surface,
  wherein the second first-circulation-member-side abutment portion is formed in the same plane as the first division surface,
  wherein the second circulation member includes a first second-circulation member and a second second-circulation-member-side member, the first second-circulation member being provided on one side of a second division surface dividing the circular cross section of the second ball circulation passage, the second second-circulation member-side member being provided on an opposite side of the second division surface, and
  wherein the second second-circulation-member-side abutment portion is formed in the same plane as the second division surface.

6. The power steering apparatus according to claim 5, wherein one of the first first-circulation member and the second second-circulation member includes a first-circulation-member-side first protrusion portion and a first-circulation-member-side second protrusion portion, which are at least one pair of protrusion portions protruding toward the other of the first first-circulation member and the second second-circulation member, and the other of the first first-circulation member and the second second-circulation member includes a first-circulation-member-side first protrusion portion insertion hole and a first-circulation-member-side second protrusion portion insertion hole, the first-circulation-member-side first protrusion portion insertion hole being configured to be fitted to the first-circulation-member-side first protrusion portion in a clearance-fit manner by insertion of the first-circulation-member-side first protrusion portion therein, the first-circulation-member-side second protrusion portion insertion hole being configured to allow the first-circulation-member-side second protrusion portion to be press-fitted therein, and
  wherein one of the first second-circulation member and the second second-circulation member includes a second-circulation-member-side first protrusion portion and a second-circulation-member-side second protrusion portion, which are at least one pair of protrusion portions protruding toward the other of the first second-circulation member and the second second-circulation member, and the other of the first second-circulation member and the second second-circulation member includes a second-circulation-member-side first protrusion portion insertion hole and a second-circulation-member-side second protrusion portion insertion hole, the second-circulation-member-side first protrusion portion insertion hole being configured to be fitted to the second-circulation-member-side first protrusion portion in a clearance-fit manner by insertion of the second-circulation-member-side first protrusion portion therein, the second-circulation-member-side second protrusion portion insertion hole being configured to allow the second-circulation-member-side second protrusion portion to be press-fitted therein.

7. The power steering apparatus according to claim 1, wherein the first connection passage includes, at an end portion thereof on one side where the first inner peripheral-side opening portion is located, a first end surface abutment portion which an end surface of the first insertion portion opposite from the first circulation portion is in abutment with,
  wherein the first end surface abutment portion is formed in such a manner that, in a radial direction of the rotational axis of the nut, a portion of the first end surface abutment portion that is located on an innermost side in the radial direction is positioned on an inner side in the radial direction with respect to an entire area of the end surface of the first insertion portion in abutment with the first end surface abutment portion,
  wherein the second connection passage includes, at an end portion thereof on one side where the second inner peripheral-side opening portion is located, a second end surface abutment portion which an end surface of the second insertion portion opposite from the second circulation portion is in abutment with, and
  wherein the second end surface abutment portion is formed in such a manner that, in the radial direction of the rotational axis of the nut, a portion of the second end surface abutment portion that is located on the innermost side in the radial direction is positioned on the inner side in the radial direction with respect to an entire area of the end surface of the second insertion portion in abutment with the second end surface abutment portion.

8. The power steering apparatus according to claim 1, wherein the first circulation member includes a first radial position restriction portion provided on an inner side in a radial direction of the rotational axis of the nut and provided in abutment with a surface of the nut on an outer side in the radial direction, and
  wherein the second circulation member includes a second radial position restriction portion provided on the inner side in the radial direction of the rotational axis of the nut and provided in abutment with the surface of the nut on the outer side in the radial direction.

9. The power steering apparatus according to claim 1, wherein the first insertion portion includes a first axial position restriction portion configured to restrict a relative movement in a direction along the rotational axis of the nut relative to the first connection passage, and wherein the second insertion portion includes a second axial position restriction portion configured to restrict a relative movement in the direction along the rotational axis of the nut relative to the second connection passage.

10. The power steering apparatus according to claim 9, wherein the first insertion portion is inserted in the first connection passage with the first axial position restriction portion compressed and deformed in the first connection passage, and wherein the second insertion portion is inserted in the second connection passage with the second axial position restriction portion compressed and deformed in the second connection passage.

11. The power steering apparatus according to claim 10, wherein the first axial position restriction portion is protrusion portions provided on both sides of the first insertion portion in the direction along the rotational axis of the nut, and wherein the second axial position restriction portion is protrusion portions provided on both sides of the second insertion portion in the direction along the rotational axis of the nut.

12. The power steering apparatus according to claim 11, wherein the first insertion portion includes a pair of flat surface portions generally orthogonal to the direction along the rotational axis of the nut on the both sides in the direction along the rotational axis of the nut, and the first axial position restriction portion, which is the protrusion portions, is provided on the flat surface portions of the first insertion portion, and wherein the second insertion portion includes a pair of flat surface portions generally orthogonal to the direction along the rotational axis of the nut on the both sides in the direction along the rotational axis of the nut, and the second axial position restriction portion, which is the protrusion portions, is provided on the flat surface portions of the second insertion portion.

13. The power steering apparatus according to claim 1, wherein the nut includes:

a main body portion provided at an intermediate portion in a direction along the rotational axis of the nut;

a first flange portion and a second flange portion which are a pair of flange portions provided on both sides of the main body portion in the direction along the rotational axis of the nut and protruding outward in a radial direction of the rotational axis of the nut;

a first rounded portion provided between the main body portion and the first flange portion and formed in an arc-like manner so that a dimension of an outer diameter in the radial direction of the rotational axis of the nut gradually increases from one side where the main body portion is located toward an opposite side where the first flange portion is located; and a second rounded portion provided between the main body portion and the second flange portion and formed in an arc-like manner so that a dimension of an outer shape in the direction of the rotational axis of the nut gradually increases from one side where the main body portion is located toward an opposite side where the second flange portion is located, wherein the first circulation member includes a first runout portion formed so as to be separated from the first rounded portion at a portion facing the first rounded portion, and wherein the second circulation member includes a second runout portion formed so as to be separated from the second rounded portion at a portion facing the second rounded portion.

14. The power steering apparatus according to claim 1, further comprising a fixation member configured to fix the first circulation member and the second circulation member to the nut, wherein the fixation member is provided so as to generate a force in a direction in which the first-circulation-member-side abutment portion and the second-circulation-member-side abutment portion are pressed against each other.

15. The power steering apparatus according to claim 14, wherein the fixation member biases the first circulation member and the second circulation member inward in a radial direction of the rotational axis of the nut.

16. The power steering apparatus according to claim 1, wherein the nut-side ball screw groove is formed in such a manner that the number of windings of the nut-side ball screw groove from the first inner peripheral-side opening portion to the second inner peripheral-side opening portion has a value after a decimal point that is larger than 0.5 .

* * * * *